(12) United States Patent
VanBenschoten et al.

(10) Patent No.: US 11,860,860 B2
(45) Date of Patent: Jan. 2, 2024

(54) METHODS AND SYSTEMS FOR NON-BLOCKING TRANSACTIONS

(71) Applicant: Cockroach Labs, Inc., New York, NY (US)

(72) Inventors: Nathan J. VanBenschoten, New York, NY (US); Andrei Matei, Brooklyn, NY (US); Andrew E. Kimball, Moraga, CA (US)

(73) Assignee: Cockroach Labs, Inc., New York, NY (US)

( * ) Notice: Subject to any disclaimer, the term of this patent is extended or adjusted under 35 U.S.C. 154(b) by 0 days.

(21) Appl. No.: 17/371,403

(22) Filed: Jul. 9, 2021

(65) Prior Publication Data

US 2023/0021150 A1 Jan. 19, 2023

(51) Int. Cl.
*G06F 16/23* (2019.01)
*G06F 16/27* (2019.01)

(52) U.S. Cl.
CPC ........ *G06F 16/2379* (2019.01); *G06F 16/273* (2019.01); *G06F 16/278* (2019.01)

(58) Field of Classification Search
CPC ...... G06F 16/27; G06F 16/273; G06F 16/278; G06F 16/2365; G06F 16/2379; G06F 16/219; G06F 16/20; G06F 16/213; G06F 16/2322

See application file for complete search history.

(56) References Cited

U.S. PATENT DOCUMENTS

| | | | |
|---|---|---|---|
| 10,783,133 B1 * | 9/2020 | Hsieh | G06F 16/2322 |
| 11,151,062 B2 * | 10/2021 | Wilkinson | G06F 11/1458 |
| 2019/0342188 A1 * | 11/2019 | Raman | G06F 16/2365 |

OTHER PUBLICATIONS

Corbett et al., "Spanner: Google's Globally Distributed Database," ACM Transactions on Computer Systems, vol. 31, No. 3, Article 8, Aug. 2013, 22 pages.
Demirbas et al., "Beyond True Time: Using Augmented Time for Improving Spanner," augmentedTime, Jul. 27, 2013, 5 pages.
Geng et al, "Exploiting a Natural Network Effect for Scalable, Fine-grained Clock Synchronization," https://www.usenix.org/conference/nsdi18/presentation/geng—Apr. 2018, 15 pages.
(Continued)

*Primary Examiner* — Marcin R Filipczyk
(74) *Attorney, Agent, or Firm* — Goodwin Procter LLP

(57) ABSTRACT

Methods and systems for executing non-blocking transactions at a database are provided. The method includes receiving a write transaction that is directed to a partition of a table stored by a cluster of database nodes. The method includes generating, at a database node of the cluster, a synthetic timestamp based on a first time associated with the database node and a duration, wherein the synthetic timestamp exceeds the first time by the duration. The method includes executing, based on determining the synthetic timestamp, one or more operations of the write transaction at one or more replicas of the partition. The method includes committing, based on a threshold number of acknowledgements, the one or more operations of the write transaction at the one or more replicas. The method includes sending, based on a second time exceeding the synthetic timestamp, an indication of success of the write transaction.

28 Claims, 6 Drawing Sheets

(56) References Cited

OTHER PUBLICATIONS

Hong et al., "KuaFu: Closing the Parallelism Gap in Database Replication," DOI:10.1109/ICDE.2013.6544908, Conference: Data Engineering (ICDE), 2013 IEEE 29th International Conference, 10 pages.
Kulkarni et al., "Logical Physical Clocks and Consistent Snapshots in Globally Distributed Databases," Michigan State University, Apr. 2014, 13 pages.
Peng and Dabek, "Large-scale Incremental Processing Using Distributed Transactions and Notifications," Proceedings of the 9th USENIX Symposium on Operating Systems Design and Implementation, USENIX, (2010). 14 pages.
Ren et al., "SLOG—Serializable, Low-latency, Geo-replicated Transactions," Geo-replicated Transactions. PVLDB, 12(11): pp. 1747-1761, 2019. DOI: https://doi.org/10.14778/3342263.3342647.

* cited by examiner

METHODS AND SYSTEMS FOR NON-BLOCKING TRANSACTIONS

FIELD OF TECHNOLOGY

The present disclosure relates generally to methods and systems for managing transactions within a distributed database and more particularly, to applying non-blocking transactions to reduce latencies and enable present time reads during database operation.

BACKGROUND

The foregoing examples of the related art and limitations therewith are intended to be illustrative and not exclusive, and are not admitted to be "prior art." Other limitations of the related art will become apparent to those of skill in the art upon a reading of the specification and a study of the drawings. In some cases, relational databases can apply replication to ensure data survivability, where data is replicated among one or more computing devices ("nodes") of a group of computing devices ("cluster"). A relational database may store data within one or more ranges, where a range is comprised of one or more key-value pairs and is replicated among one or more nodes of the cluster. A range may be a partition of a table, where a table may comprise one or more ranges. In some cases, multiple data table configurations may be used to optimally serve range data to client devices. Data tables can be configured based on the usage of the stored data and whether the data is frequently read and/or written by client devices.

One configuration can include geo-partitioned data tables, which are optimized to serve data locally to configured geographic locations on a row by row basis, where a row may be configured to serve a specific geographic location. Geo-partitioned data tables may be configured for local data access, where local client devices may read-often and write-often for the data stored by the geo-partitioned data tables. Based on the read-often and write-often usage of geo-partitioned tables, latencies for both read transactions and write transactions may be fast (e.g., less than 5 ms) for local client devices. But, read transactions and write transactions for client devices outside of the locality of the geo-partitioned data tables may face slower latencies (e.g., greater than 100 ms).

Another configuration can include reference tables, which are optimized to serve data globally regardless of the locality of the reference tables or the locality of the client devices that access the reference tables. Reference tables may be configured for global data access, where remote client devices may read-mostly and write-rarely for the data stored by the reference tables. Based on the read-mostly and write-rarely usage of reference tables, latencies for read transactions may be consistently fast (e.g., less than 5 ms) for client devices that access the reference tables, but latencies for write transactions may be slow (e.g., greater than 100 ms) for client devices that access the reference tables.

Further, in both geo-partitioned and reference table configurations, read transactions may be served historical (e.g., stale data) as a tradeoff for a reduction in read latency, such that the data served to read transactions is not representative of the data stored (or being written to) by the tables. Additionally, for current database topology, the latencies for read transactions may be slower when a read transaction conflicts with an ongoing write transaction at the reference table, as the read transaction may be required to wait for the write transaction to commit prior to reading the key-value (s). Accordingly, additional solutions are required to serve consistent, present time reads from the database and reduce the effects (e.g., increased transaction latencies) of conflicting transactions.

Existing solutions for serving consistent reads and reducing the effects of conflicting transactions can include a follower reads configuration, which can rely on an underlying leaseholder node configuration for operation. In a leaseholder node configuration, a node of the cluster may be configured as a "leaseholder" node, storing a replica of a range. Zero or more other nodes of the cluster may be configured as "follower" nodes, storing additional replicas of the range. The leaseholder node may be typically configured to receive and coordinate both read transactions and write transactions for the nodes of the cluster, being the only node with the ability to serve read transactions. Follower nodes are typically configured to route received read transactions to the leaseholder node, such that the leaseholder node can serve read transactions without coordinating with the follower nodes. However, with a follower reads configuration, follower nodes may be able to serve read transactions directly, without coordinating with the leaseholder node. The follower reads configuration may be advantageous over the leaseholder node configuration for multiple reasons. One reason may be an ability to avoid network hops caused by routing read requests to the leaseholder node, thereby reducing latencies for read transactions. Another reason may be an ability to reduce the concentration of network traffic at the leaseholder node, as the leaseholder node and the follower nodes could serve read transactions, eliminating the need to route read transactions to the leaseholder node. However, a shortcoming of a follower reads configuration is that follower nodes are limited to serving consistent historical reads (e.g., stale reads) from their stored ranges, as they currently lack the ability to serve read transactions at the present time. Such a shortcoming can reduce their application to read-only transactions, while eliminating their application to read-write transactions.

Existing solutions for serving consistent reads and reducing the effects of conflicting transactions can also include a duplicate index configuration, which can also rely on the underlying leaseholder node configuration for operation. The duplicate index configuration may be applied to geo-partitioned data tables to enable an ability to serve consistent, present-time reads. In the duplicate index configuration, read transactions can be served locally to client devices, eliminating the need for network hops (e.g., to different regions) to route read transactions to leaseholder nodes. The read transactions can also be served at the present time, resulting in non-stale reads that accurately represent the data stored by the range. But, the performance of the duplicate index configuration suffers when read transactions and write transactions conflict, as read transactions are blocked on write transactions and are required to wait for the write transaction to complete. Accordingly, contention in the duplicate index configuration can result in read latencies that are orders of magnitude slower than expected during non-contentious operations. Further, the duplicate index configuration is transactionally (i.e. ergonomically) heavy to implement among nodes of a cluster to maintain consistency, while also requiring additional levels of fault tolerance (e.g., replication among nodes) that increases storage requirements for the ranges. As such, improved methods and systems are required to serve consistent, present-time reads from ranges, while reducing the effects of conflicting transactions at a particular range of the database.

SUMMARY

Methods and systems for execution of non-blocking transactions at a database are disclosed. In one aspect, embodiments of the invention feature a method for execution of non-blocking transactions. According to one embodiment, the method can include receiving a write transaction for a database, wherein the write transaction is directed to a partition of a table stored by a cluster of database nodes. The method can include generating, at a database node of the cluster, a synthetic timestamp based on a first time associated with the database node and a duration, wherein the synthetic timestamp exceeds the first time by the duration. The method can include executing, based on determining the synthetic timestamp, one or more operations of the write transaction at one or more replicas of the partition. The method can include committing, based on a threshold number of the one or more replicas acknowledging the write transaction, the one or more operations of the write transaction at the one or more replicas. The method can include sending, based on a second time exceeding the synthetic timestamp, an indication of success of the write transaction to a client device.

In various embodiments, the write transaction can be directed to a second partition of a second table stored by the cluster of database nodes. The method can further include generating a second synthetic timestamp based on a third time associated with the cluster of database nodes and the duration, wherein the second synthetic timestamp exceeds the third time by the duration; and executing, based on determining the second synthetic timestamp, the one or more operations of the write transaction at one or more replicas of the second partition. In some embodiments, the sending the indication of success of the write transaction to the client device further can include sending, based on the second time exceeding the synthetic timestamp and the second synthetic timestamp, an indication of success of the write transaction to a client device. The one or more replicas can be stored among a plurality of nodes of the cluster. The executing one or more operations of the write transaction can further include writing one or more provisional values to one or more key values of each of the one or more replicas; and appending, to one or more transaction logs associated with each of the one or more replicas, the one or more operations of the write transaction. The one or more replicas can include a leader replica and zero or more follower replicas.

In some embodiments, the method can include sending, from the leader replica to the zero or more follower replicas, the write transaction. In some embodiments, the method can include sending, from the leader replica to the zero or more follower replicas, a closed timestamp update comprising the synthetic timestamp, wherein the zero or more follower replicas are each configured to serve a read transaction prior to the synthetic timestamp. In some embodiments, the committing the write transaction at one or more replicas can further include committing, at the leader replica, the one or more operations of the write transaction prior to the synthetic timestamp; and sending, from the leader replica, an indication to commit the one or more operations of the write transaction to the zero or more follower replicas. The method can further include monitoring a clock during the execution of the one or more operations of the write transaction, wherein the first time and the second time are derived from the clock; determining the clock to be approaching the synthetic timestamp; increasing the duration by a configured interval; and updating the synthetic timestamp based on the increased duration. The method can further include receiving a read transaction at a fourth time, wherein the read transaction is directed to the partition, and wherein the fourth time is before the synthetic timestamp. In some embodiments, the method can further include serving, from a replica of the one or more replicas, the read transaction based on determining the synthetic timestamp to be after an uncertainty interval, wherein the uncertainty interval is configured based on the fourth time and a maximum clock offset. In some embodiments, the replica can be a follower replica. The method can further include updating the fourth time to a fifth time based on determining the synthetic timestamp to be within an uncertainty interval, wherein the fifth time is after the synthetic timestamp, and wherein the uncertainty interval is configured based on the fourth time and a maximum clock offset; and serving, from a replica of the one or more replicas, the read transaction at the fifth time. The method can further include receiving, from a client device, a read transaction at a sixth time, wherein the read request is directed to the partition, wherein the sixth time is after the synthetic timestamp; and serving, from a replica of the one or more replicas, the read request.

In another aspect, the invention features a system for execution of non-blocking transactions. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
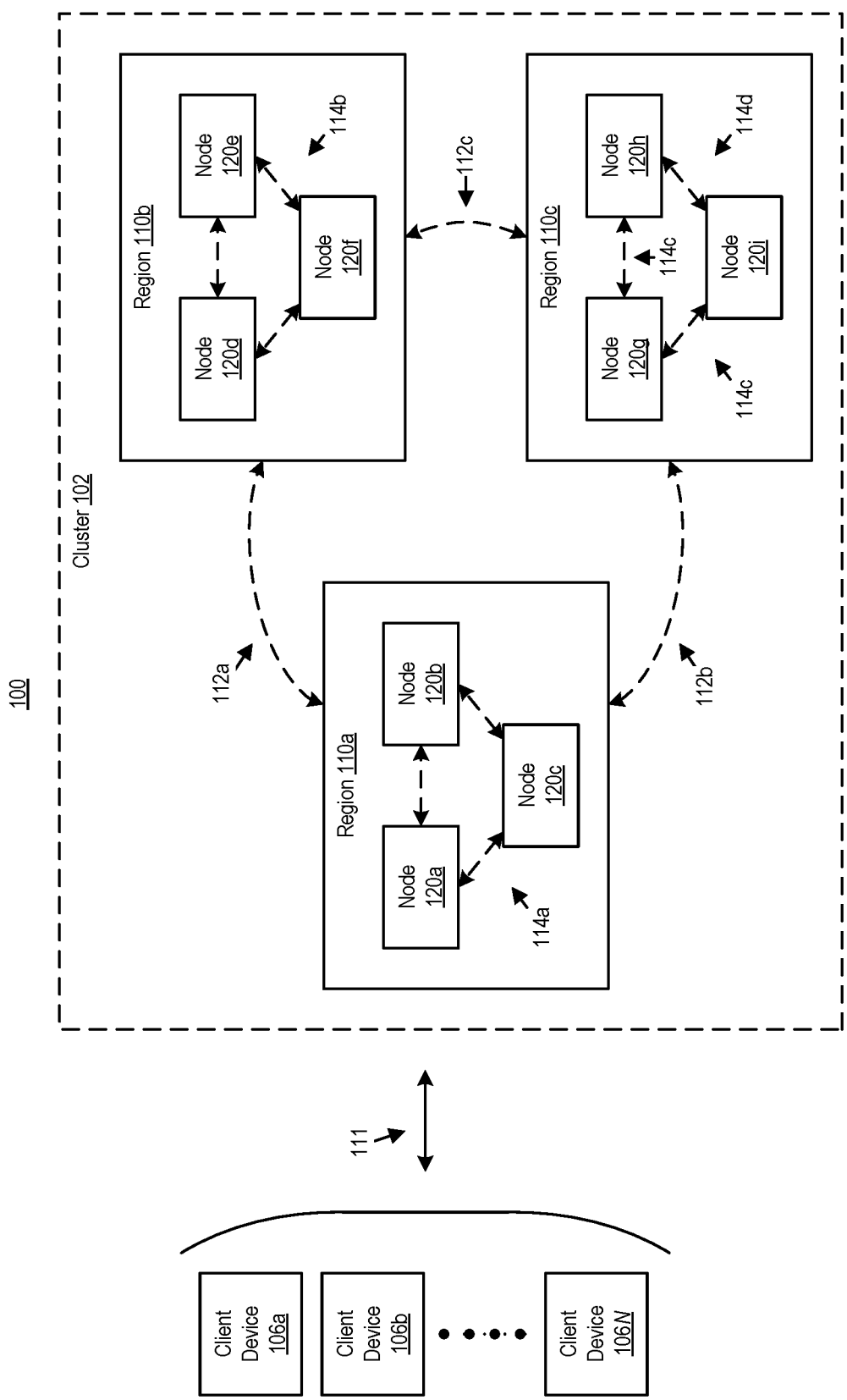
FIG. 1 shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for execution of non-blocking transactions at a database are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, it has proven difficult to implement solutions for serving consistent, present-time reads from a database, while also minimizing the effects of contending transactions (e.g., between read transactions and write transactions) at particular key-values and/or ranges of the database. Existing database topology techniques require for a single node (e.g., a leaseholder node) of a cluster to serve reads to client devices for a particular subset (e.g., range) of data, rather than allowing additional nodes (e.g., follower nodes) on which the data is replicated to serve reads. Adding an ability to the existing database topology to serve reads from follower nodes can beneficial to the database both because it can reduce read latencies by avoiding network hops (e.g., in geo-partitioned data table configurations) and because it can serve as a form of load-balancing for concentrated read traffic at the leaseholder node, thereby reducing tail latencies. Further, adding an ability to the existing database topology to serve consistent, present time reads from any node storing a replica of the data can make the data accessible to more read transactions and accessible to read-write transactions.

Existing database topology techniques result in conflicting transactions when transactions overlap in time. Conflict between transactions is especially problematic for read-heavy data, where ongoing write transactions on the read-heavy data can cause subsequent read transactions to be blocked from the read-heavy data, thereby increasing read latencies. Adding an ability to perform writes on read-heavy data without causing conflicting read transactions to block would be beneficial for providing predictable read latencies. Such predictability would be especially important in reference (e.g., global) data table configurations, where read/write contention can significantly delay read transactions (e.g., for up to 100's of ms) as the read transactions are routed to navigate network latencies (e.g., wide area network latencies) in order to resolve conflicts. Thus, there is a pressing need for improved techniques for a database to serve consistent, low latency reads at a present time (e.g., non-stale data), while minimizing the disruption (e.g., blocking) from contending transactions.

Terms

"Cluster" generally refers to a deployment of computing devices that comprise a database. A cluster may be located in one or more geographic locations (e.g., data centers). The one or more geographic locations may be located within a single geographic region (e.g., eastern United States, central United States, etc.) or more than one geographic location. For example, a cluster may be located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of key-value pairs. A node may store a "range", which can be a subset of the key-value pairs (or all of the key-value pairs depending on the size of the range) stored by the cluster. A table and its secondary indexes can be mapped to one or more ranges, where each key-value pair in a range may represent a single row in the table (which can also be known as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Replica" generally refers to a copy of a range. A range may be replicated a threshold number of times. For example, a range may be replicated 3 times into 3 distinct replicas. Each replica of a range may be stored on a distinct node of a cluster. For example, 3 replicas of a range may each be stored on a different node of a cluster. In some cases, a range may be required to be replicated a minimum of 3 times.

"Leaseholder" or "leaseholder replica" generally refers to a replica of a range that is configured to hold the lease for the replicas of the range. The leaseholder may receive and/or coordinate read transactions and write transactions directed to one or more key-value pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range. In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica.

"Raft log" generally refers to a time-ordered log of write transactions to a range, where the log of write transactions includes write transactions agreed to by a threshold number of the replicas of the range. Each replica of a range may include a raft log stored on the node that stores the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the ranges targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a key-value store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed key-value store.

In some embodiments, as described herein, the key-value store of the database may be comprised of one or more ranges. A range may be a configured storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on other nodes such that the range can still be accessed by client devices and replicated to other nodes of the cluster.

In some embodiments, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus algorithm to ensure a threshold number of replicas of the range agree to commit the change. The threshold may be a majority of the replicas of the range. The consensus algorithm may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time.

Database Layers

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

SQL Layer

In some embodiments, the database architecture for the cluster may include a SQL layer. In some cases, the database may operate using at least some American National Standards Institute (ANSI) defined SQL standards. The SQL layer may operate as an intermediary between client devices and nodes of the cluster. Client devices may interact with and/or otherwise access a database using SQL statements. Client devices may include a SQL application programming interface (API) to communicate with the cluster. SQL statements may reach a node of the cluster via a wire protocol. For example, SQL statements may be sent to a node of the cluster via a PostgreSQL wire protocol. The SQL layer may convert the SQL statements (received from the client devices) to a plan of key-value (KV) operations. The SQL layer may send the converted KV operations to another layer of the database.

Based on receiving a SQL request from a client device at a node of the cluster, the SQL layer may parse the SQL request in view of the supported syntax of the database. Based on parsing the SQL request, the SQL layer may convert a query of the SQL request into an abstract syntax tree (AST) to create a query plan associated with the SQL request. The AST may be used to generate a query plan based on three phases. In phase 1, the AST may be transformed into a logical query plan, where the SQL layer may perform semantic analysis. In some cases, as a part of semantic analysis, the SQL layer may determine whether the query of the SQL request is valid, resolve names within the query, remove intermediate computations that are determined to be unnecessary, and/or determine data types for intermediate results of the query. In phase 2, the SQL layer may simplify the logical query plan using one or more transformation optimizations. In phase 3, the SQL layer may optimize the logical query plan using a search algorithm, wherein the search algorithm evaluates one or more methods of executing the query and selects the method having the lowest cost. In some cases, the cost may be measured in time. Cost may be determined based on estimating the time each node in the query plan will use to process all results of the query and modeling data flow through the query plan. The result of phase 3 may be an optimized logical query plan.

In some embodiments, based on determining an optimized logical query plan for the SQL request, the SQL layer may determine which nodes of the cluster may be included in execution of the query to generate a physical plan. The SQL layer may determine the nodes to be included in the execution of the query based on locality (e.g., location) information for the range. For example, the SQL layer may distribute the query to nodes located close to the geographic location of the stored data. Based on generating the physical plan, the SQL layer may send the physical plan to one or more nodes for execution.

On each node that received the physical plan, the SQL layer may determine a part of the query. One or more logical processors located at each node may communicate with each other over a logical flow of data to determine one or more results for the query. The results of the query may be combined and sent back to the node where the SQL request was received. Based on receiving the combined results of the query at the node where the SQL request was received, the SQL may send the combined results to the client device.

To execute the query, each processor of a node may require encoded data for the scalar values manipulated by the query. The encoded data may be a binary data that is different from the string data used in the SQL layer. Based on requiring binary data, the contents of the SQL query may be encoded to binary form, such that the binary data may be communicated between logical processors and/or read from a storage device of the node.

In some embodiments, the SQL layer may encode data for use by the lower layers of the database during query execution. The SQL layer may encode data by converting row data (e.g., from a SQL representation as strings) into bytes for use by lower layers of the database. Based on receiving data as bytes (e.g., returned from lower layers after query execution), the SQL layer may convert the bytes into string data, such that the string data may be sent to the client device. In some cases, such byte encoding may preserve the order of the received string data. By storing bytes in the same order as the string data as it was received, the database may efficiently scan for KV data stored in ranges.

In some embodiments, for non-indexed columns of a range, the SQL layer may instead use an encoding method (e.g. value encoding) that requires less storage capacity. Value encoding may not preserve the ordering of the received string data of the SQL query.

Transaction Layer

In some embodiments, the database architecture for the cluster may include a transaction layer. The transaction layer may enable atomicity, consistency, isolation, and durability (ACID) semantics for transactions within the database. The transaction layer may receive binary KV operations from the SQL layer and control KV operations sent to a distribution layer.

In some embodiments, for write transactions, the transaction layer may generate one or more locks. A lock may represent a provisional, uncommitted state. The lock may be written as part of the write transaction. The database architecture may include multiple lock types. In some cases, the transactional layer may generate unreplicated locks, which may be stored in an in-memory, lock table that is specific to the node on which the write transaction executes. An unreplicated lock may not be replicated based on the consensus algorithm as described herein. In other cases, the transactional layer may generate one or more replicated locks (or write intents). A replicated lock may operate as a provisional value and an exclusive lock on a node on which the write transaction executed. A replicated lock may be replicated to other nodes of the cluster comprising the range based on the consensus algorithm as described herein. In some cases, a replicated lock may be known as a "write intent".

In some embodiments, a transaction record may be stored in a replica of a range where a first write transaction occurs. A transaction record may include a state of the transaction. States for a transaction may include the following: pending, staging, committed, or aborted. A pending state may indicate that a write intent's transaction is in progress. A staging state may be used to enable parallel commits as to be described herein. A write transaction may or may not be in a committed state during a staging state. An aborted state may indicate the write transaction has been aborted and the values (e.g., values written to the range) associated with the write transaction may be discarded and/or otherwise dropped from the range. As write intents are generated by the transaction layer as a part of a write transaction, the transaction layer may check for newer (e.g., more recent) committed values at the KVs of the range on which the write transaction is operating. If newer committed values exist at the KVs of the range, the write transaction may be restarted. Alternately, if the write transaction identifies write intents at the KVs of the range, the write transaction may be resolved as a transaction conflict as to be described herein.

In some embodiments, for read transactions, the transaction layer may execute a read transaction at KVs of a range indicated by the read transaction. The transaction layer may execute the read transaction if the read transaction is not aborted. The read transaction may read multi-version concurrency control (MVCC) values at the KVs of the range as to be described herein in "Storage Layer". Alternately, the read transaction may read write intents at the KVs, such that the read transaction may be resolved as a transaction conflict as to be described herein.

In some embodiments, to commit a write transaction, the transaction layer may determine the transaction record of the write transaction as it executes. The transaction layer may restart the write transaction based on determining the state of the write transaction indicated by the transaction record is aborted. Alternatively, the transaction layer may determine the transaction record to indicate the state as pending or staging. Based on the transaction record indicating the write transaction is in a pending state, the transaction layer may set the transaction record to staging and determine whether the write intents of the write transaction have succeeded (i.e. been replicated to the other nodes of the cluster storing the range). If the write intents have succeeded, the transaction layer may report the commit of the transaction to the client device that initiated the write transaction.

In some embodiments, based on committing a write transaction, the transaction layer may cleanup the committed write transaction. A coordinating node of the cluster of nodes to which the write transaction was directed may cleanup the committed write transaction via the transaction layer. A coordinating node may be a node that comprises the range that is the subject of the transaction. The coordinating node may track a record of the KVs that were the subject of the write transaction. To clean up the transaction, the coordinating node may modify the state of the transaction record for the write transaction from staging to committed. In some cases, the coordinating node may resolve the write intents of the write transaction to MVCC (i.e. committed) values by removing the pointer to the transaction record. Based on removing the pointer to the transaction record for the write transaction, the coordinating node may delete the write intents of the transaction.

In some embodiments, the transaction layer may track timing of transactions (e.g., to maintain serializability). The transaction layer may implement hybrid-logical clocks (HLCs) to track time within the cluster. An HLC may be composed of a physical component (e.g., which may be close to local wall time) and a logical component (e.g., which is used to distinguish between events with the same physical component). HLC time may always be greater than or be equal to the wall time. Each node may include a local HLC.

For a transaction, the gateway node (e.g., the node that initially receives a transaction) may determine a timestamp for the transaction based on HLC time for the node. The transaction layer may enable transaction timestamps based on HLC time. A timestamp within the cluster may be used to track versions of KVs (e.g., through MVCC as to be described herein) and provide guaranteed transactional isolation.

For a transaction, based on a node sending a transaction to another node, the node may include the timestamp generated by the local HLC (i.e. the HLC of the node) with the transaction. Based on receiving a request from another node (i.e. sender node), a node (i.e. receiver node) may inform the local HLC of the timestamp supplied with the transaction by the sender node. In some cases, the receiver node may update the local HLC of the receiver node with the timestamp included in the received transaction. Such a process may ensure that all data read and/or written to a node has a timestamp less than the HLC time at the node. Accordingly, the leaseholder for a range may serve reads for data stored by the leaseholder, where the read transaction that reads the data includes an HLC time greater than HLC timestamp of the MVCC value read by the read transaction (i.e., the read occurs "after" the write).

In some embodiments, to maintain data consistency, the transaction layer may cause a node to crash. A node may crash if the node detects that its local HLC is out of sync with at least half of the other nodes in the cluster. In some cases, out of sync may be defined as 80% of the maximum allowed offset. A maximum allowed offset may be the maximum allowed timestamp difference between nodes of the cluster. In an example, the maximum allowed offset may be 500 ms.

To provide serializability within the cluster, based on a transaction reading a value, the transaction layer may store the operation's timestamp in a timestamp cache. The timestamp cache may include the transaction having the latest timestamp (i.e. the furthest ahead in time) for value(s) read by the transaction. Based on execution of a write transaction, the transaction layer may compare the timestamp of the write transaction to the timestamp cache. If the timestamp is less than the latest time of the timestamp cache, the transaction layer may attempt to advance the timestamp of the write transaction forward to a later time. In some cases, advancing the timestamp may cause the write transaction to restart in the second phase of the transaction as to be described herein with respect to read refreshing.

As described herein, the SQL layer may convert SQL statements (e.g., received from client devices) to KV operations. KV operations generated from the SQL layer may use a Client Transaction (CT) transactional interface of the transaction layer to interact with the KVs stored by the cluster. The CT transactional interface may include a Transaction Coordination Sender (TCS). The TCS may perform one or more operations as a part of the transaction layer. Based on the execution of a transaction, the TCS may send (e.g., periodically send) "heartbeat" messages to a transaction record for the transaction record. These messages may indicate that the transaction should keep executing (i.e. be kept alive). If the TCS fails to send the "heartbeat" messages, the transaction layer may modify the transaction record to an aborted status. The TCS may track each written KV and/or KV range during the course of a transaction. In some embodiments, the TCS may clean and/or otherwise clear accumulated transaction operations. The TCS may clear an accumulated write intent for a write transaction based on the status of the transaction changing to committed or aborted.

As described herein, to track the status of a transaction during execution, the transaction layer writes a value (known as a transaction record) to the KV store. Write intents of the transaction may route conflicting transactions to the transaction record, such that the conflicting transaction may determine a status for conflicting write intents. The transaction layer may write transaction records to the same range as the first KV indicated in a transaction. The TCS may track the first KV indicated in a transaction. The transaction layer may generate the transaction when one of the following occurs: the write operation commits; the TCS sends heartbeat messages for the transaction; or an operation forces the transaction to abort. As described herein, a transaction record may have one of the following states: pending, committed, staging, or aborted. In some cases, the transaction record may not exist. If a transaction encounters a write intent, where a transaction record corresponding to the write intent does not exist, the transaction may use the timestamp of the write intent to determine how to proceed. If the timestamp of the write intent is within a transaction liveness threshold, the write intent may be treated as pending. If the timestamp of the write intent is not within the transaction liveness threshold, the write intent may be treated as aborted. A transaction liveness threshold may be a duration based on a period for sending "heartbeat" messages. For example, the transaction liveness threshold may be a duration lasting for 5 "heartbeat" message periods, such that after 5 missed heartbeat messages, a transaction may be aborted. The transaction record for a committed transaction may remain until each of the write intents of the transaction are converted to MVCC values.

As described herein, in the transaction layer, values may not be written directly to the storage layer during a write transaction. Values may be written in a provisional (i.e. uncommitted) state known as a write intent. Write intents may be MVCC values with a pointer to a transaction record to which the MVCC value belongs. Based on interacting with a write intent (instead of an MVCC value), an operation may determine the status of the transaction record, such that the operation may determine how to interpret the write intent. As described herein, if a transaction record is not found for a write intent, the operation may determine the timestamp of the write intent to evaluate whether or not the write intent may be considered to be expired.

In some embodiments, based on encountering and/or otherwise interacting with a write intent, an operation may attempt to resolve the write intent. The operation may resolve the write intent based on the state of the write intent identified in the transaction record. For a committed state, the operation may read the write intent and convert the write intent to an MVCC value. The operation may convert the write intent to an MVCC value by removing the write intent's pointer to the transaction record. For an aborted state, the operation may ignore the write intent (e.g., the operation may not read the write intent) and the operation may delete the write intent. For a pending state, a transaction conflict may exist and the transaction conflict may be resolved as to be described herein. For a staging state, the operation may determine whether the staging transaction is still in progress. The operation may determine the transaction is still in progress by verifying that the TCS is still sending "heartbeat" messages to the transaction record. If the operation verifies the TCS is sending "heartbeat" messages to the record, the operation should wait. For a record that does not exist, the operation may determine the transaction state to be pending if the write intent was created within a transaction liveness threshold as described herein. If the write intent was not created within a transaction liveness threshold, the operation may determine the write intent to be aborted.

In some embodiments, the transaction layer may include a concurrency manager for concurrency control. The concurrency manager may sequence incoming requests (e.g., from transactions) and may provide isolation between the transactions that issued those requests that intend to perform conflicting operations. This activity may be known as concurrency control. The concurrency manager may combine the operations of a latch manager and a lock table to accomplish this work. The latch manager may sequence the incoming requests and may provide isolation between those requests. The lock table may provide locking and sequencing of requests (in combination with the latch manager). The lock table may be a per-node, in-memory data structure. The lock table may hold a collection of locks acquired by transactions that are in-progress as to be described herein.

As described herein, the concurrency manager may be a structure that sequences incoming requests and provides isolation between the transactions that issued those requests, where the requests intend to perform conflicting operations. During sequencing, the concurrency manager may identify conflicts. The concurrency manager may resolve conflicts based on passive queuing and/or active pushing. Once a request has been sequenced by the concurrency manager, the request may execute (e.g., without other conflicting requests/operations) based on the isolation provided by the concurrency manager. This isolation may last for the duration of the request. The isolation may terminate based on (e.g., after) completion of the request. Each request in a transaction may be isolated from other requests. Each request may be isolated during the duration of the request, after the request has completed (e.g., based on the request acquiring locks), and/or within the duration of the transaction comprising the request. The concurrency manager may allow transactional requests (i.e. requests originating from transactions) to acquire locks, where the locks may exist for durations longer than the duration of the requests themselves. The locks may extend the duration of the isolation provided over specific keys stored by the cluster to the duration of the transaction. The locks may be released when the transaction commits or aborts. Other requests that encounter and/or otherwise interact with the locks (e.g., while being sequenced) may wait in a queue for the locks to be released. Based on the locks being released, the other requests may proceed. The concurrency manager may include information for external locks (e.g., the write intents)

In some embodiments, one or more locks may not be controlled by the concurrency manager, such that one or more locks may not be discovered during sequencing. As an example, write intents (i.e. replicated, exclusive locks) may be stored such that that may not be detected until request evaluation time. In most embodiments, fairness may be ensured between requests, such that if any two requests conflict, the request that arrived first will be sequenced first. Sequencing may guarantee first-in, first-out (FIFO) semantics. An exception to FIFO semantics is that a request that is part of a transaction which has already acquired a lock may not need to wait on that lock during sequencing. The request may disregard any queue that has formed on the lock. Lock tables as to be described herein may include one or more other exceptions to the FIFO semantics described herein.

In some embodiments, as described herein, a lock table may be a per-node, in-memory data structure. The lock table may store a collection of locks acquired by in-progress transactions. Each lock in the lock table may have an associated lock wait-queue. Conflicting transactions can queue in the associated lock wait-queue based on waiting for the lock to be released. Items in the locally stored lock wait-queue may be propagated as necessary (e.g., via RPC) to an existing Transaction Wait Queue (TWQ). The TWQ may be stored on the leader replica of the range, where the leader replica may contain the transaction record.

As described herein, databases stored by the cluster may be read and written using one or more "requests". A transaction may be composed of one or more requests. Isolation may be needed to separate requests. Additionally, isolation may be needed to separate transactions. Isolation for requests and/or transactions may be accomplished by maintaining multiple versions and/or by allowing requests to acquire locks. Isolation based on multiple versions may require a form of mutual exclusion, such that a read and a conflicting lock acquisition do not occur concurrently. The lock table may provide locking and/or sequencing of requests (in combination with the use of latches).

In some embodiments, locks may last for a longer duration than the requests associated with the locks. Locks may extend the duration of the isolation provided over specific KVs to the duration of the transaction associated with the lock. As described herein, may be released when the transaction commits or aborts. Other requests that encounter and/or otherwise interact with the locks (e.g., while being sequenced) may wait in a queue for the locks to be released. Based on the locks being released, the other requests may proceed. In some embodiments, the lock table may enable fairness between requests, such that if two requests conflict, then the request that arrived first may be sequenced first. In some cases, there may be exceptions to the FIFO semantics as described herein. A request that is part of a transaction that has acquired a lock may not need to wait on that lock during sequencing, such that the request may ignore a queue that has formed on the lock. In some embodiments, contending requests that encounter different levels of contention may be sequenced in a non-FIFO order. Such sequencing in a non-FIFO order may enable greater concurrency. As an example, if requests $R_1$ and $R_2$ contend on key $K_2$, but $R_1$ is also waiting at key $K_1$, $R_2$ may be determined to have priority over $R_1$, such that $R_2$ may be executed on $K_2$.

In some embodiments, as described herein, a latch manager may sequence incoming requests and may provide isolation between those requests. The latch manager may sequence and provide isolation to requests under the supervision of the concurrency manager. A latch manager may operate as follows. As write requests occur for a range, a leaseholder of the range may serialize write requests for the range. Serializing the requests may group the requests into a consistent order. To enforce the serialization, the leaseholder may create a "latch" for the keys in the write value, such that a write request may be given uncontested access to the keys. If other requests access the leaseholder for the same set of keys as the previous write request, the other requests may wait for the latch to be released before proceeding. In some cases, read requests may generate latches. Multiple read latches over the same keys may be held concurrently. A read latch and a write latch over the same keys may not be held concurrently.

In some embodiments, the transaction layer may execute transactions at a serializable transaction isolation level. A serializable isolation level may not prevent anomalies in data stored by the cluster. A serializable isolation level may be enforced by requiring the client device to retry transactions if serializability violations are possible.

In some embodiments, the transaction layer may allow for one or more conflict types, where a conflict type may result from a transaction encountering and/or otherwise interacting with a write intent at a key. A write/write conflict may occur when two pending transactions create write intents for the same key. A write/read conflict may occur when a read transaction encounters an existing write intent with a timestamp less than the timestamp of the read transaction. To resolve the conflicts, the transaction layer may proceed through one or more operations. Based on a transaction within the conflicting transactions having a defined transaction priority (e.g., high priority, low priority, etc.), the transaction layer may abort the transaction with lower priority (in a write/write conflict) or advance the timestamp of the transaction having a lower priority. Based on a transaction within the conflicting transactions expired, the expired transaction may be aborted. A transaction may be considered to be expired if the transaction does not have a transaction record and the timestamp for the transaction is outside of the transaction liveness threshold. A transaction may be considered to be expired if the transaction record corresponding to the transaction has not received a "heartbeat" message from the TCS within the transaction liveness threshold. A transaction (e.g. a low priority transaction) that is required to wait on a conflicting transaction may enter the TWQ as described herein.

In some embodiments, the transaction layer may allow for one or more additional conflict types that do not involve write intents. A write after read conflict may occur when a write transaction having a lower timestamp conflicts with a read transaction having a higher timestamp. The timestamp of the write transaction may advance past the timestamp of the read transaction, such that the write transaction may execute. A read within an uncertainty window may occur when a read transaction encounters a KV with a higher timestamp and there exists ambiguity whether the KV should be considered to be in the future or in the past of the read transaction. An uncertainty window may be configured based on the maximum allowed offset between the clocks (e.g., HLCs) of any two nodes within the cluster. In an example, the uncertainty window may be equivalent to the maximum allowed offset. A read within an uncertainty window may occur based on clock skew. The transaction layer may advance the timestamp of the read transaction past the timestamp of the KV according to read refreshing as to be described herein. If the read transaction associated with a read within an uncertainty window has to be restarted, the read transaction may never encounter an uncertainty window on any node which was previously visited by the read transaction. In some cases, there may not exist an uncertainty window for KVs read from the gateway node of the read transaction.

In some embodiments, as described herein, the Transaction Wait Queue (TWQ) may track a transaction that could not advance another transaction corresponding to write intents encountered by the transaction. The transaction may wait for the blocking transaction to complete before it can execute. The structure of the TWQ may map a transaction to the one or more other transactions blocked by the transaction. The TWQ may operate on the leader replica of a range, where the leader replica includes the transaction record. Based on a blocking transaction (i.e. a transaction that blocks one or more other transactions) resolving (e.g., by committing or aborting), an indication may be sent to the TWQ that indicates the transactions blocked by the blocking transaction may begin to execute. A blocked transaction (i.e. a transaction blocked by a blocking transaction) may examine their transaction status to determine whether they are active. If the transaction status for the blocked transaction indicates the blocked transaction is aborted, the blocked transaction may be removed by the transaction layer. In some cases, deadlock may occur between transactions, where a first transaction may be blocked by write intents of a second transaction and the second transaction may be blocked by write intents of the first transaction. If transactions are deadlocked, one transaction of the deadlocked transactions may randomly abort, such that the active (i.e. alive) transaction may execute and the deadlock may be removed.

In some embodiments, the transaction layer may enable read refreshing. When a timestamp of a transaction has been advanced, additional considerations may be required before the transaction may commit at the advanced timestamp. Considerations may include checking KVs previously read by the transaction to verify that other write transactions have not occurred at the KVs between the original transaction timestamp and the advanced transaction timestamp. This consideration may prevent serializability violations. The check may be executed by tracking each read using a Refresh Request (RR). If the check succeeds (e.g., write transactions have not occurred between the original transaction timestamp and the advanced transaction timestamp), the transaction may be allowed to commit. A transaction may perform the check at a commit time if the transaction was advanced by a different transaction or by the timestamp cache. A transaction may perform the check based on encountering a read within an uncertainty interval. If the check is unsuccessful, then the transaction may be retried at the advanced timestamp.

In some embodiments, the transaction layer may enable transaction pipelining. Write transactions may be pipelined when being replicated to follower replicas and when being written to storage. Transaction pipelining may reduce the latency of transactions that perform multiple writes. In transaction pipelining, write intents may be replicated from leaseholders to follower replicas in parallel, such that waiting for a commit occurs at transaction commit time. Transaction pipelining may include one or more operations. In transaction pipelining, for each statement, the gateway node corresponding to the transaction may communicate with the leaseholders ($L_1, L_2, L_3, \ldots, L_i$) for the ranges indicated by the transaction. Each leaseholder $L_i$ may receive the communication from the gateway node and may perform one or more operations in parallel. Each leaseholder $L_i$ may create write intents and may send the write intents to corresponding follower nodes for the leaseholder $L_i$. Each $L_i$ may respond to the gateway node that the write intents have been sent. Note that replication of the intents is still in-flight at this stage. Before committing the transaction, the gateway node may wait for the write intents to be replicated in parallel to each of the follower nodes of the leaseholders. Based on receiving responses from the leaseholders that the write intents have propagated to the follower nodes, the gateway node may commit the transaction.

In some embodiments, the transaction layer may enable parallel commits. Parallel commits may be an atomic commit protocol that reduces the commit latency of a transaction (e.g., in half, from two rounds of consensus down to one). In some cases, the latency incurred by transactions may be substantially close to the sum of all read latencies plus one round of consensus latency. For parallel commits, a transaction coordinator may return a commit acknowledgment to a client device based on determining the writes in the transaction have succeeded. Based on determining the writes in the transaction have succeeded, the transaction coordinator may set the state of the transaction record state to committed and resolve the write intents of the transaction (e.g., asynchronously).

In some embodiments, a parallel commits protocol may occur based on one or more operations. A client device may initiate a write transaction. A transaction coordinator may be created by the transaction layer to manage the state of the write transaction. The client device may issue a write to a key "Alpha" of a range. The transaction coordinator may generate a write intent on the "Alpha" key where the data from the write will be written. The write intent may include a timestamp and a pointer to a currently nonexistent transaction record for the write. Each write intent in the write transaction may be assigned a unique sequence number. The unique sequence number may uniquely identify the write intent. The client device may issue a write to a key "Beta" of the range as a part of the same write transaction as the write to the "Alpha" key. The transaction coordinator may generate a write intent on the "Beta" key where the data from the write transaction will be written. The write intent may include a timestamp and a pointer to the same nonexistent transaction record as for the "Alpha" key, based on each write intent being a part of the same transaction. The client device may issue a request to commit the writes for the write transaction. The transaction coordinator may create the transaction record and may set the state of the transaction record to staging. The transaction coordinator may record the keys of each write being executed by replicas among the range. Based on receiving the commit request from the client device, the transaction coordinator may wait for the pending rights to be replicated across the cluster. Based on the pending writes being replicated, the transaction coordinator may return indication to the client device that the transaction was committed successfully.

In some embodiments, the write transaction may be considered atomically committed while the state of the corresponding transaction record is staging. A transaction may be considered to be committed (e.g., atomically committed) based on one or more logically equivalent states. A logically equivalent state may include the state of the transaction record being staging and successful replication of writes across the cluster (e.g., according to consensus). Transactions in such a state may be considered implicitly committed. A logically committed state may include the state of the transaction record being committed. Transactions in such a state may be considered explicitly committed. For an implicitly committed state, the transaction coordinator may modify the state of the transaction record from staging to committed, such that other transactions do not encounter the transaction in the staging state (e.g., due to being time intensive).

Distribution Layer

In some embodiments, the database architecture for the cluster may include a distribution layer. The distribution layer may provide a unified view of the data stored by the cluster. To enable the ability to access data stored by the cluster from any single node of the cluster, the distribution layer may enable storage of data in a monolithic sorted map of KV pairs. As described herein, the key-space comprising the sorted map of KV pairs may be divided into one or more contiguous chunks, known as ranges, such that every key may be located in a single range of the sorted map. The sorted map may enable simple lookups and efficient scans for data stored by the cluster. Simple lookups may be enabled based on the ability to identify nodes responsible for certain portions (i.e. ranges) of data. Efficient scans may be enabled based on the defining the order of data within ranges. The distribution layer may receive requests (e.g., transactions) from the transaction layer on the same node. The distribution layer may identify which node should receive the request (from the transaction layer) and send the request to the replication layer of the node corresponding to the request.

In some embodiments, the monolithic sorted map structure of the distribution layer may be comprised of two fundamental elements. A first fundamental element may be system data, where system data includes meta ranges that describe the location of user data (i.e. client data) within the cluster. A second fundamental element may be user data, where user data is the client data stored by the cluster for access via one or more client devices.

In some embodiments, the location of each range stored by the cluster may be stored in one or more meta ranges. A meta range may be a two-level index at the beginning of the key-space, where the first level (known hereinafter as "meta1") may address the second level, and the second (known as "meta2") may address user data stored by the cluster. Each node of the cluster may include information indicative of the location of the meta1 range (known as a range descriptor for the cluster). In some cases, the meta range may not be split by exceeding a threshold storage size (e.g., in contrast to other ranges stored by the cluster). Otherwise, in most embodiments, meta ranges may be configured as ranges as described herein and may be replicated and/or otherwise accessed as KV data (i.e. user data) stored by the cluster.

In some embodiments, to optimize data access, each node of the cluster may cache values of the meta2 range that were previously accessed by the node, which may optimize access to meta2 range data. Based on determining that a meta2 cache is invalid for a KV, the node may update the meta2 cache by performing a read transaction on the corresponding meta2 range.

In some embodiments, user data may be stored after and/or otherwise below the meta ranges (e.g., the meta1 range and meta2 range) in each node of the cluster. User data may also be known as "table data". Each table and secondary indexes (of user data) may initially be mapped to a single range. The single range may be the initial mapping for the user data based on the user data being below a threshold storage size for a range. In some cases, the threshold storage size may be 512 MiB as described herein. Each key in a range may represent a single row of a table or a single row of a secondary index. Each key in a range representing a single row of a table may be known as a "primary index" based on the table being sorted by a primary key. Based on exceeding a threshold storage size, a range may split into two ranges. Ranges as described herein may be replicated (by a replication layer as to be described herein), with addresses of each replicated range stored in a meta2 range.

In some embodiments, based on receiving a request (e.g., a read transaction, a write transaction, etc.), a node may determine where the request should be routed (e.g., which node of the cluster the request should be routed to). The node may compare key(s) indicated by the request to keys stored by the meta2 range to determine a node to which the route the request. The node may route the request to a node that stores the keys indicated by the request. If the node has cached a subset of the meta2 range corresponding to the key(s) indicated by the request, the node may compare the key(s) indicated by the request to the cached meta2 range. Alternatively, If the node has not cached a subset of the meta2 range corresponding to the key(s) indicated by the request, the node may send an RPC to the node including the meta2 range. Based on determining the node storing the key(s) indicated by the request, the node may send the KV operations of the request to the node storing the key(s) indicated by the request.

In some embodiments, the distribution layer may include communication software (e.g., gRPC) that enables communication between one or more nodes of the cluster. The communication software may require inputs and outputs to be formatted as protocol buffers. KV operation requests may be included and/or otherwise incorporated into protocol buffers, where a KV operation requests included in a protocol buffer may be known as Batch Request. The destination of the Batch Request may be identified in a header of the Batch Request and/or in a pointer to the transaction record corresponding to the request(s) included in the Batch Request. A Batch Request may be used to send requests between nodes of the cluster. A response to a Batch Request may be included in a protocol buffer known as a Batch Response.

In some embodiments, the distribution layer may include a Distribution Sender (DistSender). A DistSender of a gateway and/or coordinating node may receive Batch Requests from a TCS of the same node. The DistSender may separate Batch Requests into one or more separated Batch Requests. The one or more separated Batch Requests may be routed by the DistSender to the nodes that contain the keys indicated by the separated Batch Requests. The DistSender may determine the nodes based on the meta2 ranges stored on the gateway node. The DistSender may send the Batch Requests to the leaseholder(s) for the keys indicated by the Batch Requests based on the cached meta2 ranges. In some cases, the DistSender may send the Batch Requests to other replicas of ranges for the keys indicated by the Batch Requests based on the proximity of the replicas to the gateway node. Batch Requests received by non-leaseholder replicas may reply to the Batch Requests with an error including an indication of the last-known leaseholder for the range known the replica. Based on received Batch Responses to Batch Requests, the DistSender may aggregate the responses (e.g., to prepare the responses for a return to the client).

In some embodiments, as described herein, the meta ranges may be structured as KV pairs. The meta1 range and the meta2 range may be structurally similar. The meta1 range may include the addresses of nodes within the cluster that include replicas of the meta2 range. The meta2 range may include addresses for the nodes that include replicas of each range stored by the cluster. KV data stored by ranges may include a table identifier, an index identifier, and an indexed column value. Each range stored by a cluster may include metadata. The metadata for a particular range may be known as a range descriptor. Each range descriptor may include a sequential range identifier, the key space (i.e. the set of keys) included in the range, and addresses of nodes that store replicas of the range. The key space included in the range as described herein may determine the keys of the meta2 range. The addresses of nodes that store the replica of the range as described herein may determine the values for the keys of the meta2 range. A range descriptor may be updated based on one or more instances. The one or more instances may include a membership change to a consensus group for a range, a range merge, and/or a range split. Updates to a range descriptor may occur locally at a node and may propagate to the meta2 range. As described herein, a range split may occur when a range reaches and/or exceeds a threshold size. In an example, the threshold size for a range may be 512 MiB. Based on reaching or exceeding the threshold size, a range may be split into two ranges. The node that includes the split ranges may create a new consensus (i.e. Raft) group that include the nodes that were included in the previous consensus group before the range was split into two ranges. The distribution layer may generate a transaction for the meta2 range, where the transaction may be configured to update the meta2 range with the updated key space boundaries and the addresses of the nodes using the range descriptor.

Replication Layer

In some embodiments, the database architecture for the cluster may include a replication layer. The replication layer may copy data (e.g., ranges) between nodes of the cluster and enable consistency between the copied data based on a consensus algorithm as described herein. The replication layer may allow the cluster to tolerate a subset of nodes going offline and/or otherwise being unavailable, such that the range data stored by the cluster is still available to client devices. The replication layer may receive requests from the distribution layer (e.g., from the DistSender as described herein). The replication layer may send responses (e.g., Batch Responses) to the distribution layer (e.g., the DistSender). In the replication layer, if the node receiving a request is the leaseholder for the range, the node may accept the request. If the node receiving a request is not the leaseholder for the range, the node may return an error to the source of the request, where the error may include an indication of a pointer to the leaseholder (or node last known to be the leaseholder). The KV requests may be converted to Raft commands. The replication layer may write accepted requests to a storage layer as to be described herein. Committed Raft commands may be written to the Raft log and stored on a storage medium of a node via the storage layer. The leaseholder may serve reads from the storage layer.

In some embodiments, the replication layer may apply a consensus algorithm. The consensus algorithm may require a threshold number (e.g., a quorum or a majority) of replicas of a range to confirm a modification (e.g., a write transaction) to the range prior to committing the modification. Based on the consensus algorithm, the replication layer may require at least 3 nodes to include replicas of a range, such that a threshold number of replicas may agree to a modification to the range. In some cases, if the threshold number of replicas required to confirm a modification is a majority of the replicas, the replication layer may enable the database to tolerate a number of node failures as described by Equation 1:

$$\text{Tolerable Node Failures} = \frac{\text{Replication Factor} - 1}{2} \quad \text{Equation 1}$$

As described in Equation 1, a "Replication Factor" may be a number of replicas of a range stored by the cluster. For example, based on a "Replication Factor" equal to 5, the replication layer may tolerate node failure for two nodes of a cluster, where the failed nodes each store a replica of a range and three other nodes that are online store replicas of the range. In some cases, the "Replication Factor" may be configured at the cluster, database, and/or table level, where a cluster may comprise one or more databases and a database may comprise one or more ranges distributed among the nodes of the cluster.

In some embodiments, as described herein, the replication layer may include a consensus protocol (known as Raft). Raft may be an algorithm that stores data among one or more nodes of the cluster, such that the nodes may approve of the state of the data based on reaching consensus. Raft may organize the nodes storing a replica of a range in a group known as a Raft group as described herein. Each replica of a Raft group may be classified as a leader replica or a follower replica as described herein. The leader replica may coordinate writes to the follower replicas of the Raft group. The leader replica may send "heartbeat" messages to the follower replicas (e.g., periodically). The leader replica may be elected by follower replicas as to be described herein. Based on the absence of "heartbeat" messages from the leader replica, follower replicas may become candidates for the leader replica. Based on receiving a Batch Request for a range, a node may convert the KV operations indicated by the Batch Request into one or more Raft commands. The node may send the Raft commands to the Raft leader (e.g., if the node that received the Batch Request is not the leader replica). Based on receiving the Raft commands, the leader node may write the Raft commands to the Raft log as to be described herein.

In some embodiments, based on a threshold (e.g., a majority) of nodes writing a transaction and the writes being committed by the leader replica, the writes may be appended to the Raft log as described herein. The Raft log may be an ordered set of commands agreed on by a threshold number of replicas of the range. The Raft log may be a source of truth for consistent replication among nodes of the cluster. In some cases, each replica can be "snapshotted", such that a copy of the data stored by the replica may be generated for a specific applied log index. This copy of the data (i.e. a snapshot) may be sent to other nodes during a rebalance event to enable and/or expedite replication. A rebalance event may update data stored by a node to a specific log index based on the snapshot. Based on loading the snapshot, a node may be updated based on executing operations (e.g., indicated by the Raft log) that have occurred since the snapshot was taken.

In some embodiments, as described herein, a single node in the Raft group may be configured as the leaseholder. The leaseholder may be the only node that can serve reads to a client device or propose writes to the Raft group leader (e.g., both actions may be received as Batch Requests from DistSender as described herein with respect to "Distribution Layer"). When serving reads, the leaseholder may bypass the Raft protocol. The leaseholder may bypass the Raft protocol based on the consensus previously achieved for the values stored by the range. In most embodiments, the leaseholder and the leader replica may be the same replica stored on a node of the range, such that write requests may be proposed directly to the leaseholder/leader replica. The replication layer may attempt to collocate the leaseholder and leader replica during each lease renewal or transfer. If a leaseholder is not configured for a range, any node receiving a request may send a request to become the leaseholder for the range. The request may be sent to each replica to reach consensus. A node that sends a request to become the leaseholder may include a copy of the last valid lease stored by the node. If the last valid lease is equivalent to the current configured leaseholder, the request may be granted by a replica in response to receiving the request. Alternately, if the last valid lease is not equivalent to the current configured leaseholder, the request may be ignored and/or otherwise denied by a replica.

In some embodiments, to manage leases for table data, the replication layer may use "epochs". An epoch may be a period between a node joining a cluster and a node disconnecting from a cluster. To extend a lease (e.g., to remain leaseholder for a range), each node must periodically update a liveness record corresponding to the node. The liveness record may be stored on a system range key. Based on disconnecting from the cluster, a node may fail to update the liveness record. An epoch may be considered to be changed based on a node disconnecting from the cluster and/or failing to update the liveness record. The replication layer may cause a leaseholder node to lose the lease for a range based on the leaseholder node disconnecting from the cluster. In some cases, a leaseholder may not be required to renew a lease for a range. The leaseholder may lose the lease for a range based on disconnecting from the cluster.

In some embodiments, as described herein, meta ranges and/or system ranges may be stored as KV data. System ranges may be restricted from epoch-based leases. System ranges may use expiration-based leases. An expiration-based lease may expire at (or substantially close to) a timestamp. In some cases, a leaseholder for a system range may retain the expiration-based lease after the timestamp at which the expiration-based lease was configured to expire. The leaseholder for the system range may retain the expiration-based lease based on the leaseholder continuing to generate and/or otherwise propose Raft commands to a Raft group.

In some embodiments, the replication layer may enable leaseholder rebalancing. Each leaseholder for a cluster may consider (e.g., periodically consider) whether to transfer the lease to another replica of the range. In an example, a leaseholder may periodically determine whether to transfer the lease to another replica of the range every 10 minutes. Each leaseholder may be configured to transfer the lease for a range based on the number of requests from each locality (i.e. region) for the range, the number of leases on each node comprising the range, and/or the latency between localities. If replicas for a range are distributed among different localities, the replication layer may determine which replica of the cluster is optimized to be the leaseholder. In some cases, a replica may be suited to be the leaseholder based on providing the lowest latency to requests from client devices.

For leaseholder rebalancing, a leaseholder may track the number of requests received by the leaseholder from each locality of the cluster. The number of requests received by the leaseholder from each locality of the cluster may be tracked as an average (e.g., an exponentially weighted moving average). The average may determine the localities that most frequently send requests to the range. In some cases, for an exponentially weighted moving average, the locality that has recently requested the range most often may be assigned the greatest weight. Based on another locality requesting the range frequently, the moving average may cause the locality to be assigned the greatest weight.

For leaseholder rebalancing, the leaseholder may correlate each requesting locality's weight (i.e., the proportion of recent requests) to the locality of each replica by determining a similarity (e.g., similarity between country and/or region) between localities. For example, if the leaseholder received requests from gateway nodes in a region defined as the Central United States (e.g., Country=United States, Region=Central), the replication layer (or leaseholder) may assign the following weights to replicas as described in Table 1 as follows:

TABLE 1

| Replica # | Replica Locality | Replica Eeaseholder Rebalancing Weight |
|---|---|---|
| 1 | Country = United States, Region = Central | 100% |
| 2 | Country = United States, Region = East | 50% |
| 3 | Country = Australia, Region = Central | 0% |

As shown in Table 1, the "Replica #" 1, with a "Replica Locality" of the Central United States may be configured as 100% for "Replica Leaseholder Rebalancing Weight" based on having a match (e.g., a complete match) to the Country and the Region of the "Replica Locality". The "Replica #" 2, with a "Replica Locality" of the East United States may be configured as 50% for "Replica Leaseholder Rebalancing Weight" based on having a match (e.g., a partial match) to the Country of the "Replica Locality". The "Replica #" 3, with a "Replica Locality" of Central Australia may be configured as 0% for "Replica Leaseholder Rebalancing Weight" based on lacking a match with the Country and the Region of the "Replica Locality". Based on the assignment of rebalancing weights to the replicas of the range, the leaseholder may determine a rebalancing weight and latency corresponding to the leaseholder. The rebalancing weight and latency may be compared to the rebalancing weight and latency corresponding to the other replicas (e.g., as shown in Table 1) to determine an adjustment factor for each replica. In an example, the greater the disparity between weights and the larger the latency between localities, the more the replication layer may favor the node including the replica from the locality with the larger weight.

For leaseholder rebalancing, the leaseholder may evaluate each replica's rebalancing weight and adjustment factor for the localities with the largest weights. The leaseholder may transfer the lease to another replica (e.g., of the node having the largest weight and/or adjustment factor). The leaseholder may transfer the lease to the replica if transferring the lease is beneficial and/or viable.

In some embodiments, based on a change to the number of nodes of a cluster, replicas for a range may require rebalancing. The replicas may require rebalancing based on changing of the members of a Raft group (e.g., due to the change to the number of nodes of a cluster). Rebalancing may enable optimal survivability and performance. Rebalancing may vary based on whether nodes are added to the cluster or removed from the cluster for the change to the number of nodes of the cluster. Based on nodes being added to the cluster, the added node(s) may communicate identifying information to the existing nodes of the cluster. The identifying information may include an indication that the added node(s) have available storage capacity. The cluster may rebalance replicas stored by the existing nodes to the added node(s). A node may be removed from a Raft group of a cluster based on a lack of a response to the Raft group after a period of time. In an example, the period of time may be 5 minutes. Based on nodes being removed from the cluster (e.g., due to a lack of a response to the Raft group), nodes of the cluster may rebalance data stored by the removed node(s) to the remaining nodes of the cluster. Rebalancing may be enabled based on using a snapshot of a replica from the leaseholder. The snapshot may be sent to another node (e.g., over gRPC as described herein). Based on receiving and/or replicating the snapshot, the node with a replica (e.g., a replicated replica from the snapshot) may join the Raft group of the range corresponding to the replica. The node may determine the index of the added replica to lag one or more entries (e.g., the most recent entries) in the Raft log. The node may execute the actions indicated in the Raft log to update the replica to the state indicated by the most recent index of the Raft log. In some cases, replicas may be rebalanced based on the relative load stored by the nodes within a cluster.

Storage Layer

In some embodiments, the database architecture for the cluster may include a storage layer. The storage layer may enable the cluster to read and write data to storage device(s) of each node. As described herein, data may be stored as KV pairs on the storage device(s) using a storage engine. In some cases, the storage engine may be a Pebble storage engine. The storage layer may serve successful read transactions and write transactions from the replication layer.

In some embodiments, each node of the cluster may include at least one store, which may be specified when a node is activated and/or otherwise added to a cluster. Read transactions and write transactions may be processed from the store. Each store may contain two instances of the storage engine as described herein. A first instance of the storage engine may store temporary distributed SQL data. A second instance of the storage engine may store data other than the temporary distributed SQL data, including system data (e.g., meta ranges) and user data (i.e. table data, client data, etc.). For each node, a block cache may be shared between each store of the node. The store(s) of a node may store a collection of replicas of a range as described herein, where a particular replica may not be replicated among stores of the same node (or the same node), such that a replica may only exist once at a node.

In some embodiments, as described herein, the storage layer may use an embedded KV data store (i.e. Pebble). The KV data store may be used with an application programming interface (API) to read and write data to storage devices (e.g., a disk) of nodes of the cluster. The KV data store may enable atomic write batches and snapshots.

In some embodiments, the storage layer may use MVCC to enable concurrent requests. In some cases, the use of MVCC by the storage layer may guarantee consistency for the cluster. As described herein, HLC timestamp may be used to differentiate between different versions of data by tracking commit timestamps for data. HLC timestamps may be used to identify a garbage collection expiration for a value as to be described herein. In some cases, the storage layer may support time travel queries. Time travel queries may be enabled by MVCC.

In some embodiments, the storage layer may aggregate MVCC values (i.e. garbage collect MVCC values) to reduce the storage size of the data stored by the storage (e.g., the disk) of nodes. The storage layer may compact MVCC values (e.g., old MVCC values) based on the existence of a newer MVCC value with a timestamp that is older than a garbage collection period. A garbage collection period may be configured for the cluster, database, and/or table. Garbage collection may be executed for MVCC values that are not configured with a protected timestamp. A protected timestamp subsystem may ensure safety for operations that rely on historical data. Operations that may rely on historical data may include imports, backups, streaming data using change feeds, and/or online schema changes. Protected timestamps may operate based on generation of protection records by the storage layer. Protection records may be stored in an internal system table. In an example, a long-running job (e.g., such as a backup) may protect data at a certain timestamp from being garbage collected by generating a protection record associated with that data and timestamp. Based on successful creation of a protection record, the MVCC values for the specified data at timestamps less than or equal to the protected timestamp may not be garbage collected. When the job (e.g., the backup) that generated the protection record is complete, the job may remove the protection record from the data. Based on removal of the protection record, the garbage collector may operate on the formerly protected data.

Database Architecture

Referring to FIG. 1, an illustrative distributed computing system 100 is presented. The computing system 100 may include a cluster 102. The cluster 102 may include one or more nodes 120 distributed among one or more geographic regions 110. A node 120 may be a computing device, including the computing system as described herein with respect to FIG. 4. As an example, a node 120 may be a server computing device. A region 110 may correspond to a particular building (e.g., a data center), city, state/province, country, and/or a subset of any one of the above. A region 110 may include multiple elements, such as a country and a geographic identifier for the country. For example, a region 110 may be indicated by Country=United States and Region=Central (e.g., as shown in Table 1), which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more of the nodes 120. The region 110a may include nodes 120a, 120b, and 120c. The region 110b may include the nodes 120d, 120e, and 120f The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN) and/or a wide area network (WAN). In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN and/or a WAN. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices, including the computing system as described herein with respect to FIG. 4. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is a number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN or a WAN as described herein.

Transaction Execution

In some embodiments, as described herein, distributed transactional databases stored by the cluster of nodes may enable one or more transactions. Each transaction may include one or more requests and/or queries. A query may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a query to a cluster. A load balancer may route the request from the SQL client to the nodes of the cluster. A gateway may be a node that processes the request and/or responds to the SQL client. A leaseholder may be a node that serves reads and coordinates writes for a range of keys (e.g., keys indicated in the query) as described herein. A Raft leader may be a node that maintains consensus among the replicas for a range.

A SQL client (e.g., operating at a client device 106*a*) may send a request (e.g., a SQL request to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120*a*) may receive the request from the load balancer. The gateway node may parse the request to determine whether the request is valid. The request may be valid based on conforming to the SQL syntax of the database(s) stored by the cluster. The gateway node may generate a logical SQL plan based on the request. The logical plan may be converted to a physical plan to traverse the nodes indicated by the request. Based on the completion of request parsing, a SQL executor may execute the logical SQL plan and/or physical plan using the TCS as described herein. The TCS may perform KV operations on a database stored by the cluster. The TCS may account for keys indicated and/or otherwise involved in a transaction. The TCS may package KV operations into a Batch Request as described herein, where the Batch Request may be forwarded on to the DistSender of the gateway node.

The DistSender of the gateway node may receive the Batch Request from the TCS. The DistSender may determine the operations indicated by the Batch Request and may determine the node(s) (i.e. the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator (as to be described herein), the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (i.e., most recent) for any read operation that a given range has served. The comparison may ensure that the write operation has a higher timestamp than the timestamp cache. If a write operation has a lower timestamp than the timestamp cache, the write operation may be restarted at a timestamp higher than the value of the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write to complete. Based on completion of the write, the latch may be released and the subsequent operations can continue. In some cases, a batch evaluator may ensure that write operations are valid. The batch evaluator may determine whether the write is valid based on the leaseholder's data. The leaseholder's data may be evaluated by the batch evaluator based on the leaseholder coordinating writes to the range. If the batch evaluator determines the write to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft operations and write intents, such that the write operation may be replicated to the replicas of the range. The leaseholder may propose the Raft operations to the leader replica of the Raft group (e.g., which is typically the leaseholder). Based on the received Raft operations, the leader replica may send the Raft operations to the follower replicas of the Raft group. If a threshold number of the replicas acknowledge the Raft operations (e.g., the write operations), consensus may be achieved such that the Raft operations may be committed to the Raft log of the leader replica and written to the storage engine. The leader replica may send a command to the follower replicas to write the Raft operations the Raft log corresponding to each of the follower replicas. Based on the leader replica committing the Raft operations to the Raft log, the Raft operations (e.g., the write transaction) may be considered to be committed (e.g., implicitly committed as described herein). The gateway node may configure the status transaction record for the transaction corresponding to the Raft operations to committed (e.g., explicitly committed as described herein).

In some embodiments, based on the leader replica appending the Raft operations to the Raft log, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the TCS. The TCS may send the values to the SQL layer. In some cases, the TCS may also send a request to the DistSender, wherein the request includes an indication for the DistSender to convert write intents to committed values (e.g., MVCC values). The SQL layer may send the values as described herein to the SQL client that initiated the query.

Read Transaction Execution

Figure 2A:
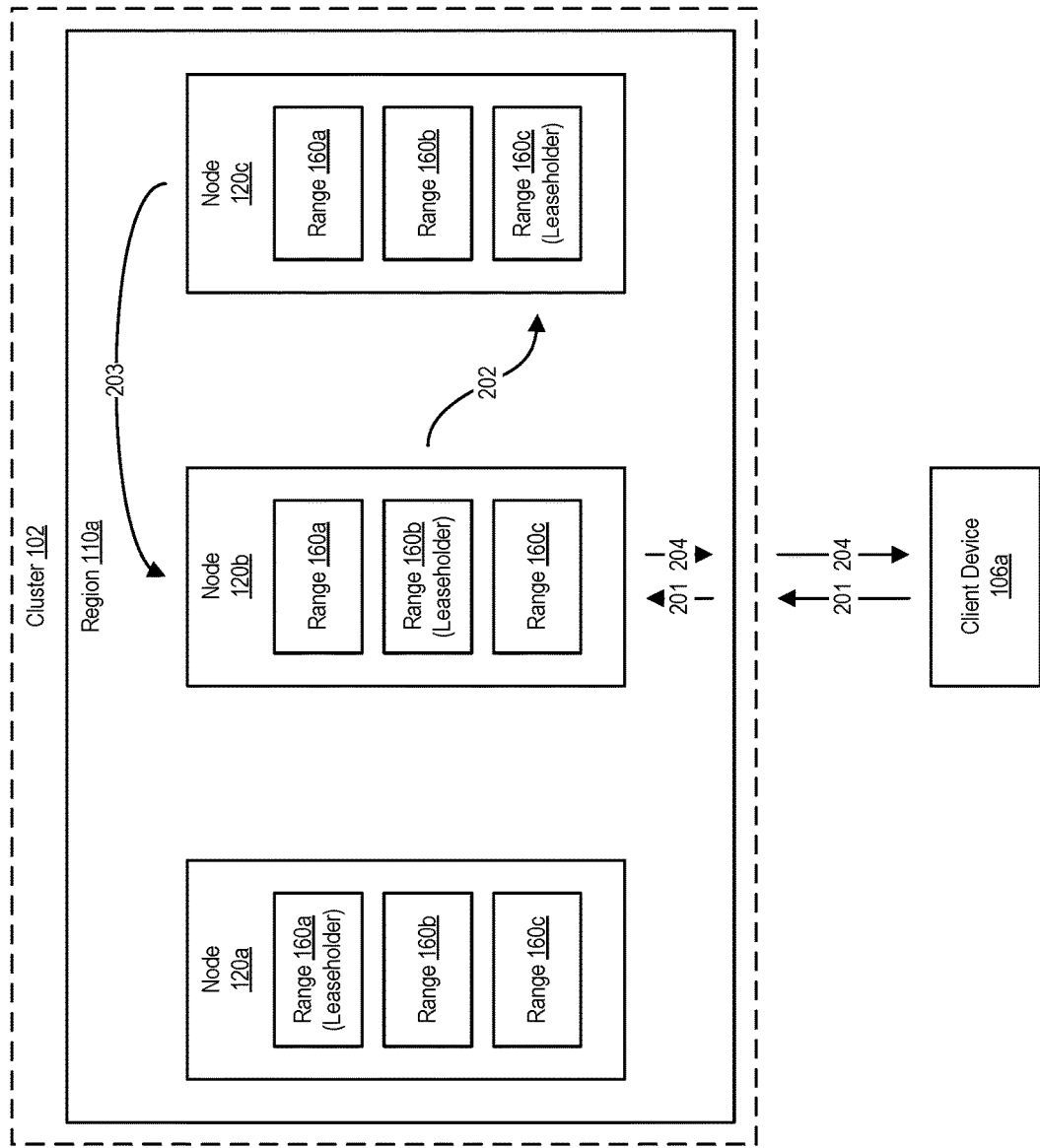
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A).

In some embodiments, a client device 106 may initiate a read transaction at a node 120 of the cluster 102. Based on the KVs indicated by the read transaction, the node 120 that initially receives the read transaction (i.e. the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120b as the gateway node. The read transaction may be directed to data stored by the range 160c. At step 202, the node 120b may route the received read transaction to node 120c. The read transaction may be routed to node 120c based on the node 120c being the leaseholder of the range 160c. The node 120c may receive the read transaction from node 120b and serve the read transaction from the range 160c. At step 203, the node 120c may send the read data to the node 120b. The node 120c may send the read data to node 120b based on the node 120b being the gateway node for the read transaction. The node 120b may receive the read data from node 120c. At step 204, the node 120b may send the read data to the client device 106a to complete the read transaction. If node 120b had been configured to include the leaseholder for the range 160c, the node 120b may have served the read data to the client device directly after step 201, without routing the read transaction to the node 120c.

Write Transaction Execution

Figure 2B:
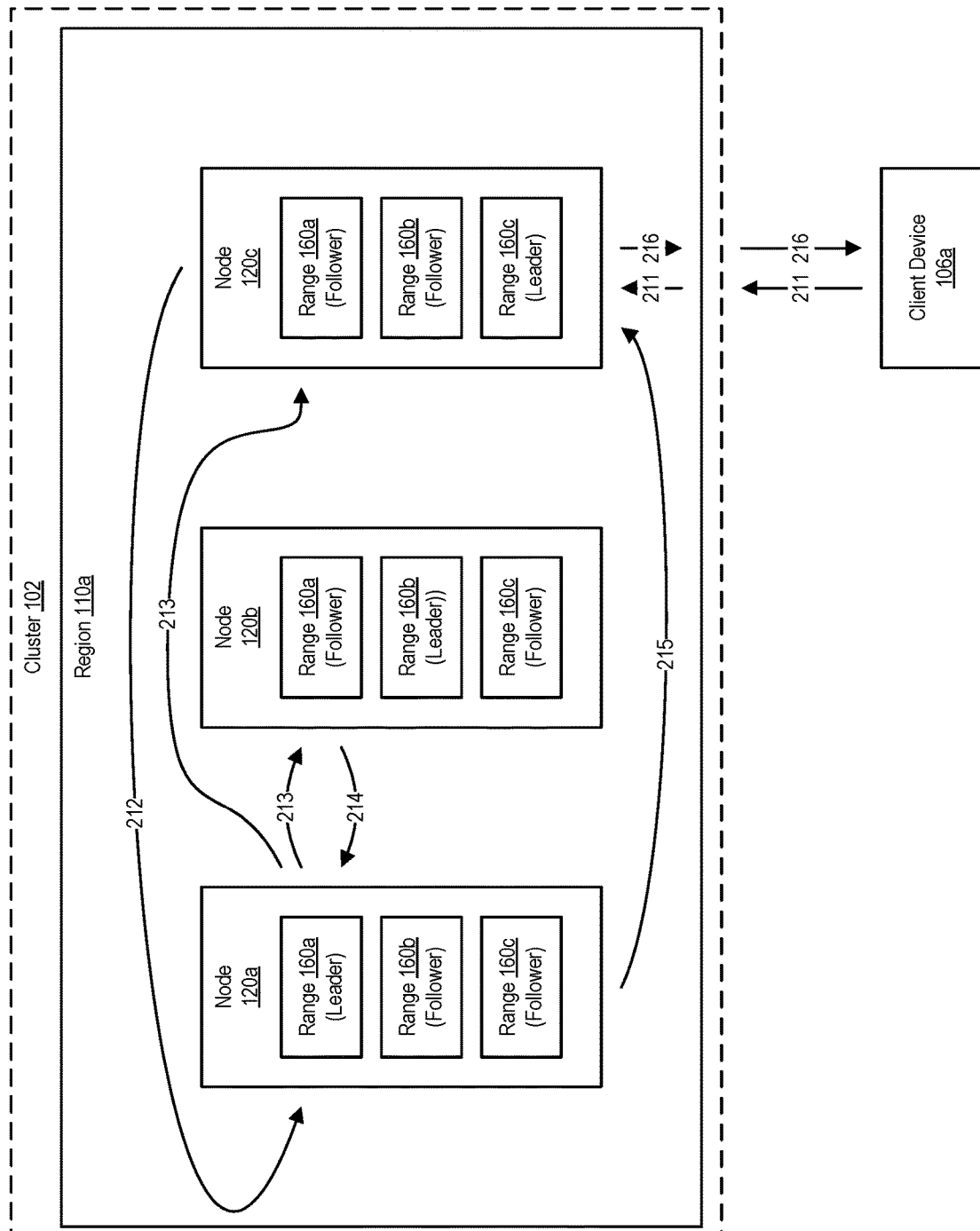
FIG. 2B shows an example of execution of a write transaction at the computing system, according to some embodiments.

Referring to FIG. 2B, an example of execution of a write transaction at the computing system 100 is presented. In some cases, as described herein, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica and the leader replica for range 160a (as indicated by "Leaseholder" in FIG. 2A and "Leader" in FIG. 2B). The node 120b may include replicas of ranges 160a, 160b, and 160c. The node 120b may include the leader replica for range 160b (as indicated by "Leader" in FIG. 2B). The node 120c may include replicas of ranges 160a, 160b, and 160c. The node 120c may include the leader replica for range 160c (as indicated by "Leader" in FIG. 2B).

In some embodiments, a client device 106 may initiate a write transaction at a node 120 of the cluster 102. Based on the KVs indicated by the write transaction, the node 120 that initially receives the write transaction (i.e. the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120c as the gateway node. The write transaction may be directed to data stored by the range 160a. At step 212, the node 120c may route the received write transaction to node 120a. The write transaction may be routed to node 120a based on the node 120a being the leaseholder of the range 160a. Based on the node 120a including the leader replica for the range 160a, the leader replica of range 160a may append the write transaction to a Raft log at node 120a. At step 213, the leader replica may simultaneously send the write transaction to the follower replicas of range 160a on the node 120b and the node 120c. The node 120b and the node 120c may append the write transaction to their respective Raft logs. At step 214, the follower replicas of the range 160a (at nodes 120b and 120c) may send an indication to the leader replica of the range 160a that the write transaction was appended to their Raft logs. Based on a threshold number of replicas indicating the write transaction was appended to their Raft logs, the leader replica and follower replicas of the range 160a may commit the write transaction. At step 215, the node 120a may send an acknowledgement of the committed write transaction to the node 120c. At step 216, the node 120c may send the acknowledgement of the committed write transaction to the client device 106a to complete the write transaction.

Non-Blocking Transactions Overview

In some embodiments, the cluster may include one or more non-blocking ranges. A transaction (e.g., a read transaction, a write transaction, etc.) that encounters and/or otherwise interacts with a non-blocking range may be converted to a non-blocking transaction. A non-blocking range may propagate closed timestamps, where the closed timestamps may lead the present time (e.g., indicated by one or more HLCs of the cluster) by a configured duration (i.e. a non-blocking duration as to be described herein). A closed timestamp may be a timestamp, where prior to the timestamp, follower replicas may serve read transactions for KVs stored prior to the timestamp (e.g., as historical reads). In some cases, a leader replica and non-leader replicas (i.e. follower replicas) of a non-blocking range may serve reads at time(s) before a closed timestamp (e.g., a synthetic timestamp) as to be described herein. A non-blocking range may enable an ability to serve reads from each (or a subset) of the replicas of the non-blocking range, such that reads may not be required to be served from the leaseholder node. For a non-blocking range, each replica (e.g., including follower replicas) may serve reads, such that read requests may not be required to be routed to the leaseholder.

In some embodiments, non-leader replicas (i.e. follower replicas) may be made available to serve historical reads. Historical reads may include transactions with a read timestamp that is sufficiently in the past (e.g., such that write transactions have completed propagating to follower replicas). Accordingly, follower reads may be consistent reads at historical timestamps from follower replicas, which may be enabled by closed timestamp updates. A closed timestamp update may be a data store-wide timestamp, where the timestamp can include per-range information indicative of Raft (i.e. consensus) progress among leader and follower replicas. Based on received closed timestamp updates, a follower replica may determine it has the necessary information to serve consistent reads for times that are at and below the received closed timestamp from the leader replica. As such, a follower replica may serve reads at any timestamp below the most recent closed timestamp. For a non-blocking range, follower replicas may receive closed timestamp updates with a synthetic timestamp that leads the present time as to be described herein. Accordingly, a follower replica may serve follower reads for timestamps below the synthetic timestamp.

In some embodiments, as described herein, a transaction may select a provisional commit timestamp. The transaction may select a provisional commit timestamp from the HLC of the gateway node from which the transaction originates. The provisional commit timestamp may be a timestamp for when the transaction performs a read operation or when the transaction initially performs a write operation. In some cases, as described herein, a transaction may be required to advance the timestamp (e.g., due to transaction contention). But, the provisional commit timestamp (and the advanced timestamp if applicable) typically lags the present time. The present time may be defined as the time observed on a node of the cluster with the fastest (e.g., most recent or highest) clock. As described herein with respect to the transaction layer, a maximum allowed offset may be the maximum time offset between nodes within the cluster. Accordingly, the present time may not be more than the maximum time offset ahead of the node having the slowest timestamp.

In some embodiments, a non-blocking transaction may perform locking such that contending read transactions may not be required to wait on the locks (e.g., the write intents) of the non-blocking transaction. In an example, the values written by a non-blocking write transaction may be committed with write intents resolved by the time that a read transaction attempts to read the values of the keys written by the non-blocking write transaction. In some cases, as described herein, a read transaction that observes write intents would need to determine the status of the write transaction via the transaction record, which may cause the read transaction to wait for the write intents to be resolved (e.g., committed, aborted, etc.). Such a process may increase transaction latencies within the cluster due to the read transaction's need to wait for the write intents to be resolved (and locks removed), as well as a need to traverse networks (e.g., switch from the node 120a to the node 120d via the network 112a) to access and/or otherwise determine the status of the transaction record. For a non-blocking write transaction, a conflicting read may not observe write intents of the non-blocking transaction, as the write intent of the non-blocking write transaction may be scheduled to committed at a specific timestamp in advance of the present time. As such, a conflicting read transaction that occurs after a non-blocking transaction may read the contents of the KV at which the non-blocking transaction is operating.

In some embodiments, non-blocking transactions and/or non-blocking ranges may use synthetic timestamps. A synthetic timestamp may be a timestamp that may be disconnected from the HLC timestamps (i.e. real timestamps) derived from nodes of the cluster. A synthetic timestamp may be a 64-bit physical value and a 32-bit logical value. A synthetic timestamp may be differentiated from a timestamp derived from an HLC via a bit difference (e.g., a higher order bit difference). The bit that indicates a timestamp as synthetic or real may be known as the indicator bit. In some cases, a synthetic timestamp and a real timestamp may be merged based on one or more rules. If a synthetic timestamp and a real timestamp are merged, the indicator bit from the timestamp having the larger value may be included in the merged timestamp. If the synthetic timestamp and the real timestamp are equivalent in value, the indicator bit from the real timestamp may be included in the merged timestamp.

In some embodiments, as described herein, a node may update the timestamp of the local HLC based on receiving a transaction from another node, where the transaction includes a timestamp greater than the timestamp of the local HLC. For a synthetic timestamp, the local HLC may not be updated with the synthetic timestamp. The local HLC may not be updated with the synthetic timestamp until the timestamp of the HLC exceeds the synthetic timestamp or the local HLC receives an update from a real timestamp (e.g., a real timestamp derived from a transaction received at the node).

In some embodiments, as described herein, the transaction layer may use uncertainty intervals. The use of uncertainty intervals for transactions may enable linearizability, as nodes of the cluster may be required to have timestamps that exceed a commit timestamp for a transaction minus the maximum allowed offset. For non-blocking transactions, a committed transaction may be required to wait for up to a non-blocking duration before acknowledging the commit to the SQL client (e.g., to ensure linearizability). An uncertainty interval may be an interval, where the interval is defined between a timestamp−a maximum allowed offset and the timestamp+the maximum allowed offset. In practice, the uncertainty interval may be an interval defined within a timestamp and the timestamp+a maximum allowed offset.

In some embodiments, for conflicting transactions involving a non-blocking write transaction and a read transaction, the read transaction may be required to wait on an uncertainty interval. Typically, as described herein, a read transaction that encounters a write transaction within the uncertainty interval may have the timestamp for the read transaction advanced past the completion of the write transaction (e.g., using a read refresh operation). But, because of the synthetic timestamp associated with the non-blocking write transaction, the read transaction may be required to wait for the timestamp associated with the read transaction to exceed the synthetic timestamp of the non-blocking transaction. The read transaction may wait for a duration of time. The duration may be the maximum allowed offset or a non-blocking duration as described herein. Based on the timestamp of the read transaction exceeding the synthetic timestamp, the read transaction may execute and read the value at the key(s) written to by the non-blocking write transaction (e.g., without the read refresh operation).

Non-Blocking Duration

In some embodiments, as described herein, one or more ranges stored by the cluster (e.g., the cluster 102) may be configured as non-blocking ranges. A non-blocking range may use a closed timestamp tracker, wherein the closed timestamp tracker may send (i.e. publish) closed timestamp updates from the leader replica to the follower replicas of the non-blocking range. In some cases, the closed timestamp tracker may prevent write transactions at timestamps equal or prior to a published closed timestamp. A leaseholder or leader for the non-blocking range may send a closed timestamp update to the follower replicas, where the timestamp included in the closed timestamp update leads the present time (e.g., local HLC time of the leaseholder) by a configured duration. In an example, the timestamp indicated by the closed timestamp update may be a synthetic timestamp. Based on the received closed timestamp update, follower replicas may serve follower reads at times less than or equal to the timestamp included in the closed timestamp updates. In an example, follower replicas may serve follower reads at a present time based on receiving a closed timestamp update with a synthetic timestamp, where the synthetic timestamp leads the timestamp of the leaseholder node by the non-blocking duration. The closed timestamp tracker may be independent of the HLC timestamps for each node that stores a replica of a range. In some cases, the closed timestamp tracker may lead the present time within the cluster (e.g., the HLC timestamps at each node) by a configured non-blocking duration (e.g., derived from or based on a synthetic timestamp). The non-blocking duration may be based on the latency between nodes and/or regions of the cluster, as well as the maximum allowed offset between nodes of the cluster. For example, the non-blocking duration may be configured based on the round trip time between the region 110a and the region 110b via the network 112a. Additionally, the non-blocking duration may be configured based on the round trip time between node 120a and node 120b via the network 114a. In some cases, the non-blocking duration may be defined by Equation 2 as follows:

$$\text{Non-blocking Duration} = \frac{\text{Latency}}{2} + \text{Maximum Offset} + \text{Clock Skew} \quad \text{Equation 2}$$

As described in Equation 2, the non-blocking duration may be configured as a function of "Latency", "Maximum Offset", and "Clock Skew". "Latency" as described herein with respect to Equation 2 may be a configured round trip time between nodes and/or regions of the cluster. Accordingly, "Latency/2" as described in Equation 2 may be representative of a one-way latency (i.e. round-trip time/2) between nodes and/or regions of the cluster. The "Latency" may vary based on the nodes and/or regions corresponding to the "Latency" configuration. The "Maximum Offset" may be the configured maximum allowed timestamp difference (e.g., HLC timestamp difference) between timestamps of nodes in the cluster as described herein. The "Clock Skew" parameter may be a constant added to the non-blocking duration to account for differences in timestamps observed at nodes. Any suitable configuration for the non-blocking duration may be selected, such that the non-blocking duration may be configured as a constant or a function of one or more parameters. Equation 2 may be one example of a configuration of the non-blocking duration.

Based on the closed timestamp tracker, a non-blocking transaction may generate locks on KVs (e.g., for write intents as a part of a write transaction) at a synthetic timestamp that leads the present time by the non-blocking duration. The non-blocking transaction may exhibit non-blocking properties to conflicting transactions based on the non-blocking duration being sufficiently large. The non-blocking duration may be sufficiently large based on an ability for the non-blocking transaction to execute operations corresponding to the transaction, commit the operations, and/or resolve intents corresponding to the committed operations before a commit timestamp for the transaction is exceeded by a combination of the present time and maximum allowable offset (e.g., the timestamp determined based on combining the present time and maximum allowable offset).

Non-Blocking Transaction Pushing

In some embodiments, a synthetic timestamp of a non-blocking transaction may be pushed and/or otherwise advanced. A synthetic timestamp of a non-blocking transaction may be pushed and/or otherwise advanced based on a combination of the present time and maximum allowable offset becoming sufficiently close to the synthetic timestamp. In some cases, a non-blocking duration corresponding to the synthetic timestamp may be advanced. A range monitor may monitor intents (e.g., write intents) associated with the non-blocking transaction. If the intents associated with the non-blocking transaction have not been resolved by the time at which the combination of the present time and maximum allowable offset are sufficiently close to the synthetic timestamp, the range monitor may cause the synthetic timestamp to advance by a configured duration. If the intents associated with the non-blocking transaction have not been resolved by the time at which the combination of the present time and maximum allowable offset are sufficiently close to the synthetic timestamp, the non-blocking duration may advance by the configured duration. As an example, if a timestamp determined from adding the present time and the maximum allowable offset is within 5 ms of a synthetic timestamp associated with a non-blocking write transaction that does not have resolved write intents, the range monitor may advance the synthetic timestamp by 100 ms, such that the determined timestamp does not exceed the synthetic timestamp. In some cases, in place of and/or in addition to the range monitor, a TCS may buffer the writes of the non-blocking transaction. The TCS may buffer (i.e. delay) the non-blocking transaction until the non-blocking transaction may be committed.

Non-Blocking Read Transaction Execution and Interactions

In some embodiments, a client device may initiate a non-blocking read transaction at the cluster. The non-blocking read transaction may be initiated via a SQL client as described herein. A non-blocking read transaction may adhere to one or more of requirements as described herein with respect to any and/or all of the database layers. The non-blocking read transaction may be a read transaction directed to a non-blocking range. Based on the KVs indicated by the read transaction, the node that initially receives the read transaction (i.e. the gateway node) from the client device may identify the read transaction as directed to a non-blocking range. The gateway node may receive the read transaction from the SQL client. The gateway node may route the read transaction to any one of the replicas of the non-blocking range. In some cases, the gateway node may route the read transaction to the replica having the lowest latency to the gateway node. The read transaction may commit to read the data stored at one or more KVs of the replica. The commit timestamp may be added to a timestamp cache as described herein. The node may send the KV data (i.e. read data) read by the read transaction to the gateway node. The gateway node may wait for a remaining subset of the non-blocking duration before returning the read data to the client device. The gateway node may send the read data to the client device.

In some embodiments, one or more transactions may conflict with the non-blocking read transaction. In some cases, a read transaction may conflict with the non-blocking read transaction. The read transaction may conflict with the non-blocking write transaction such that each of the transactions do not interact (e.g., the read transaction follows the requirements set forth in each of the database layers as described herein). In some cases, a write transaction may conflict with the non-blocking read. Based on a write transaction conflicting with an existing non-blocking read transaction, the write transaction may be converted to the non-blocking write transaction. A provisional commit timestamp for the non-blocking write transaction may be determined, where the provisional commit timestamp may be a synthetic timestamp. The synthetic timestamp may be the timestamp (i.e. the local HLC timestamp) at the leaseholder for a range corresponding to the non-blocking write transaction advanced by the non-blocking duration. Accordingly, the synthetic timestamp for the non-blocking write transaction may be greater than the commit timestamp for the non-blocking read transaction, causing the non-blocking read transaction to commit prior to the non-blocking write transaction. The non-blocking write transaction may commit at a synthetic timestamp later than the commit timestamp of the non-blocking read transaction.

Non-Blocking Write Transaction Execution and Interactions

In some embodiments, a client device may initiate a non-blocking write transaction at the cluster. The non-blocking write transaction may be initiated via a SQL client as described herein. A non-blocking write transaction may adhere to one or more of requirements as described herein with respect to any and/or all of the database layers. The non-blocking write transaction may be a write transaction directed to a non-blocking range. Based on the KVs indicated by the write transaction, the node (i.e. the gateway node) that initially receives the write transaction from the client device may identify the write transaction as directed to a non-blocking range. The gateway node may receive the write transaction from the SQL client. The gateway node may route the write transaction to a leaseholder of the non-blocking range. The leaseholder may determine a synthetic timestamp (i.e. provisional commit timestamp) for the write transaction. The synthetic timestamp may be a provisional commit timestamp for the write transaction. The leaseholder may route the write transaction to the leader replica of the non-blocking range. As described herein, in most cases, the leaseholder and the leader replica for the non-blocking range may be the same. Based on determining the synthetic timestamp (e.g., at the leaseholder), the non-blocking duration may begin. The leaseholder of the non-blocking range may track the non-blocking duration. In an example, based on the leaseholder determining the synthetic timestamp, the non-blocking duration may begin (e.g., begin to elapse or commence) at the HLC timestamp comprised in the synthetic timestamp.

Beginning at the synthetic timestamp (e.g., the synthetic timestamp at the leaseholder replica of the non-blocking range), to initiate execution of the write transaction on the non-blocking range, the leader replica may generate write intents corresponding to the write transaction. The leader replica may write the write intents to the one or more KVs indicated by the write transaction. The leader replica may append the write transaction to a Raft log of the leader replica and may send the write transaction to the corresponding follower replicas of the range for replication. The follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The acknowledgement may include the synthetic timestamp determined by the leaseholder. The gateway node may wait for the non-blocking duration (e.g., that began at the synthetic timestamp) to expire. Accordingly, the gateway node may wait for a timestamp of the clock (e.g., HLC) of the gateway node to exceed the synthetic timestamp. The non-blocking duration may expire as the timestamp of the gateway node exceeds the synthetic timestamp. The gateway node may send the acknowledgement of the write transaction to the client device 106. The gateway node may send the acknowledgement based on an expiry of the non-blocking duration. The gateway node may send the acknowledgement based on the timestamp at the gateway node exceeding the synthetic timestamp.

In some embodiments, one or more transactions may conflict with the non-blocking write transaction. In some cases, a read transaction may conflict with the non-blocking write transaction. The read transaction may conflict within an existing write transaction inside an uncertainty interval or external to the uncertainty interval. If the read transaction conflicts with the non-blocking write transaction inside the uncertainty interval, the read transaction may be required to wait for the uncertainty interval to expire as described herein before reading the KV data corresponding to the conflicting non-blocking write transaction. If the read transaction conflicts with the non-blocking write transaction external to the uncertainty interval, the read transaction may execute as described herein without interaction with the non-blocking write transaction due to waiting to commit after the non-blocking duration.

In some cases, a write transaction may conflict with the non-blocking write transaction. A provisional commit timestamp for the write transaction may be determined. The write transaction that conflicts with an existing non-blocking transaction may be required to wait for the non-blocking transaction to commit. Based on the write transaction conflicting with the existing non-blocking write transaction, the write transaction may be converted to a second non-blocking write transaction. A provisional commit timestamp for the second non-blocking write transaction may be determined. In some cases, the provisional commit timestamp for the second non-blocking write transaction may update the provisional timestamp of the original write transaction. The provisional commit timestamp for the second non-blocking write transaction may be a synthetic timestamp. The synthetic timestamp may be combination of a timestamp (i.e. the local HLC timestamp) at the leaseholder node corresponding to the non-blocking write transaction and a non-blocking duration, where the synthetic timestamp is approximately equivalent to the timestamp advanced by the non-blocking duration. Accordingly, the synthetic timestamp for the second non-blocking write transaction may be greater than the synthetic timestamp for the non-blocking write transaction. Based on a commit of the non-blocking write transaction, the second non-blocking transaction may execute as described herein with respect to the non-blocking transaction.

Figure 3A:
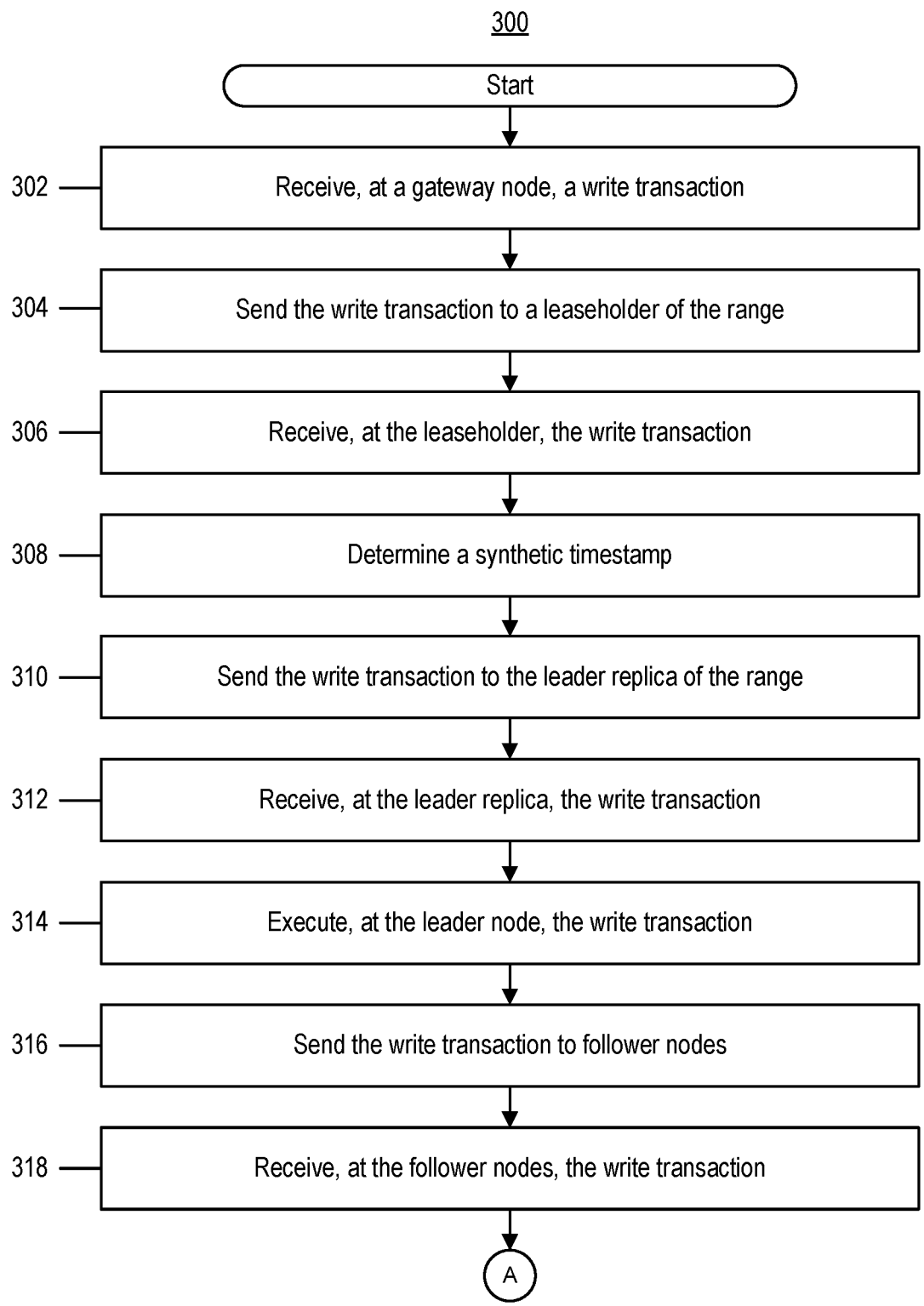
FIG. 3A shows an example flowchart for an execution method of a non-blocking write transaction at the computing system, according to some embodiments.
Figure 3B:
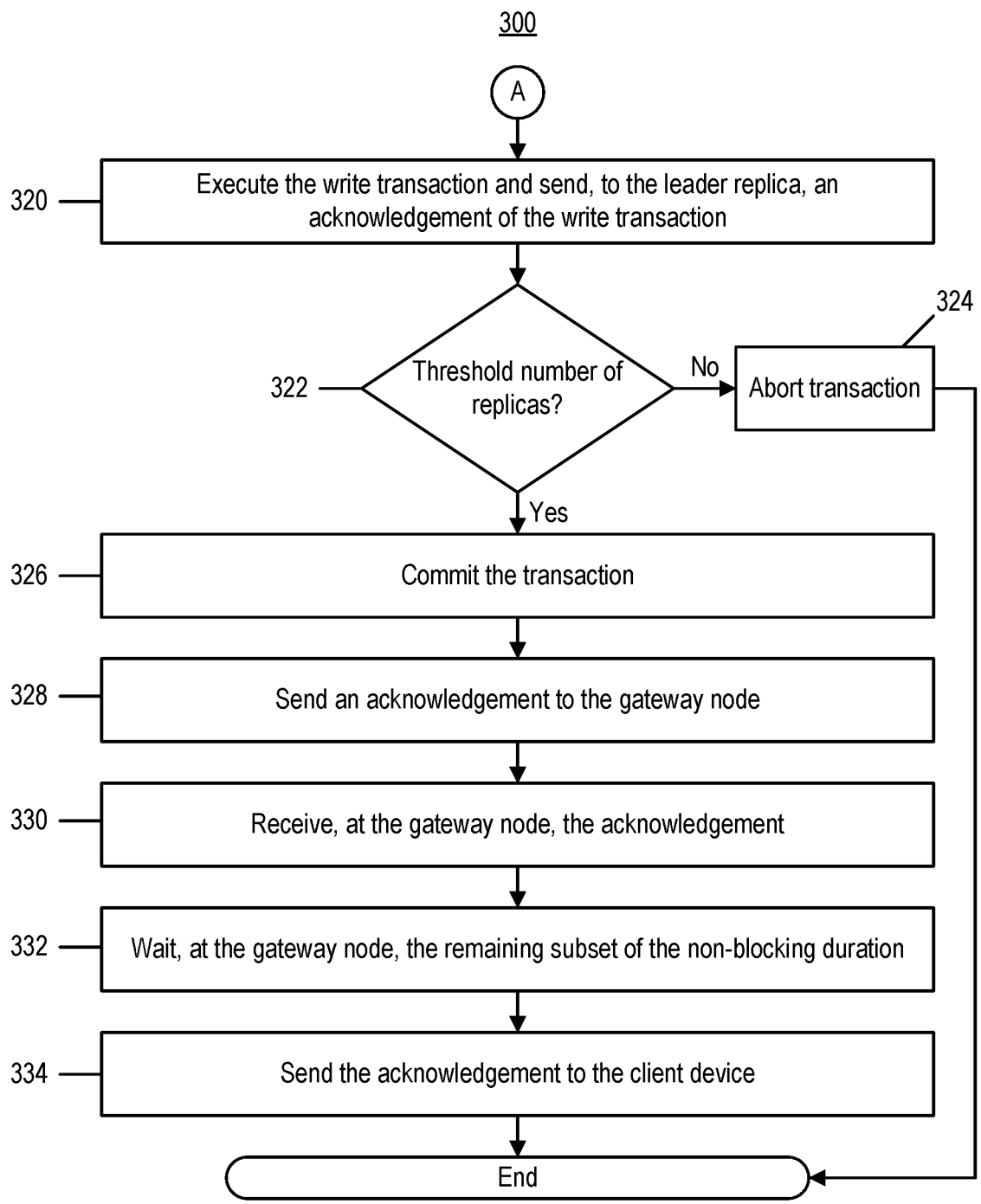
FIG. 3B shows an example flowchart for an execution method of a non-blocking write transaction at the computing system, according to some embodiments.

Referring to FIGS. 3A and 3B, an example flowchart for an execution method 300 of a non-blocking write transaction at the computing system 100 is presented. The method 300 corresponding to a transaction involving a single range, but the method 300 may be executed for any suitable number of ranges corresponding to a write transaction. In an example, a write transaction may be directed to three ranges, where the method 300 may be executed for each of the three ranges. For ranges having different leaseholders, one or more synthetic timestamps may be determined for the non-blocking write transaction. Operations of the non-blocking write transaction may occur in parallel for each range that is subject to the non-blocking write transaction. Based on receiving acknowledgements committing operations of the write transaction from one or more leader replicas, the gateway node may wait on its clock (e.g., HLC) to exceed the synthetic timestamp having the latest (i.e. maximum) time.

Referring to FIG. 3A, a client device 106a may initiate a non-blocking write transaction at the cluster 102. The client device 106a may include a client application (e.g., a SQL client application) to interact with the cluster 102. The client device 106 may send the write transaction to the cluster 102. The non-blocking write transaction may be a write transaction directed to a non-blocking range. At step 302, a gateway node (e.g., node 120c) may receive the write transaction. The gateway node may receive the write transaction via a load balancer as described herein. At step 304, the gateway node may send the write transaction to the leaseholder of the range (e.g., the non-blocking range) indicated by the write transaction. The gateway node may send the write transaction to the leaseholder of the range based on determining the range corresponding to the write transaction. A range may correspond to a write transaction if the range includes one or more KVs that are the subject of the write transaction. At step 306, the leaseholder may receive the write transaction. At step 308, the leaseholder may determine a synthetic timestamp for the write transaction. Based on determining the synthetic timestamp, a time period corresponding to the non-blocking duration may be begin. The synthetic timestamp may be a timestamp of the local HLC at the leaseholder node advanced by a non-blocking duration. At step 310, the leaseholder may send the write transaction to the leader replica of the non-blocking range. The write transaction may include the synthetic timestamp determined from the clock (e.g., HLC) of the leaseholder node. As described herein, in most cases, the leaseholder and the leader replica may be the same. In some cases, a closed timestamp update may be sent to the follower replicas, where the closed timestamp update may include the synthetic timestamp. In some cases, the closed timestamp update that includes the synthetic timestamp update may be included with the write transaction. In some cases, the closed timestamp update that includes the synthetic timestamp update may be sent with the write transaction simultaneously. Accordingly, follower replicas may serve reads for timestamps prior to the synthetic timestamp, such that follower replicas may serve present time reads.

In some embodiments, at step 312, the leader replica may receive the write transaction. In some cases, the leader replica may receive the write transaction from the leaseholder if the leaseholder and the leader replica are not the same. In some cases, the leader replica may receive the write transaction from the gateway node if the leaseholder and the leader replica are not the same. At step 314, the leader replica may execute the contents of the write transaction at the non-blocking range. To execute the contents of the write transaction, the leader replica may generate write intents corresponding to the write transaction. The leader replica may write the write intents to the one or more KVs indicated by the write transaction. The leader replica may append the write transaction to a Raft log of the leader replica. At step 316, the leader replica may send the write transaction to the follower replicas of the non-blocking range. At step 318, one or more of the follower replicas may receive the write transaction.

Referring to FIG. 3B, at step 320, one or more of the follower replicas of the range may execute operations of the write transaction and send an acknowledgement of the write transaction to the leader replica. To execute the write transaction, the one or more follower replicas may append the write transaction to their corresponding Raft logs, generate write intents, and/or write the write intents to one or more KVs. At step 322, the leader node may determine whether a threshold number of replicas (including the leader replica) have acknowledged the write transaction. A replica may acknowledge the write transaction by sending an indication to the leader replica that the write transaction was appended. At step 324, the leader node may abort the transaction based on determining a threshold number of replicas did not acknowledge the write transaction. At step 326, the leader replica may commit the transaction. One or more follower replicas may commit the transaction based on receiving an indication from the leader replica that the transaction was committed. At step 328, the leader replica may send an acknowledgement of a commit of operations of the write transaction to the gateway node. The leader replica may send the acknowledgement based on committing the write transaction. At step 330, the gateway node may receive the acknowledgement of the commit of the write transaction from the leader replica. At step 332, the gateway node may wait for a remaining subset of the non-blocking duration to expire. As described herein, the non-blocking duration may have started at the determination of the synthetic timestamp (e.g., at step 308). Accordingly, the gateway node may wait for the clock (e.g., HLC) of the gateway node to exceed the synthetic timestamp. For a non-blocking write transaction directed to more than one range, more than one synthetic timestamp may be determined. Accordingly, the gateway node may wait for the remaining subset of the non-blocking duration to expire, where the non-blocking duration corresponds to the synthetic timestamp having the latest timestamp. At step 334, the gateway node may send the acknowledgement of the commit of the write transaction to the client device 106. The gateway node may send the acknowledgement based on the expiry of the non-blocking duration. The gateway node may send the acknowledgment based on a timestamp at the gateway node exceeding or otherwise surpassing the synthetic timestamp. For a non-blocking write transaction directed to more than one range, the gateway node may send the acknowledgment based on a timestamp at the gateway node exceeding or otherwise surpassing the synthetic timestamp having the latest (i.e. maximum) timestamp. One or more steps of the method 300 as described herein may be combined, removed, and/or rearranged without departing from the scope of the present disclosure.

Further Description of Some Embodiments

Figure 4:
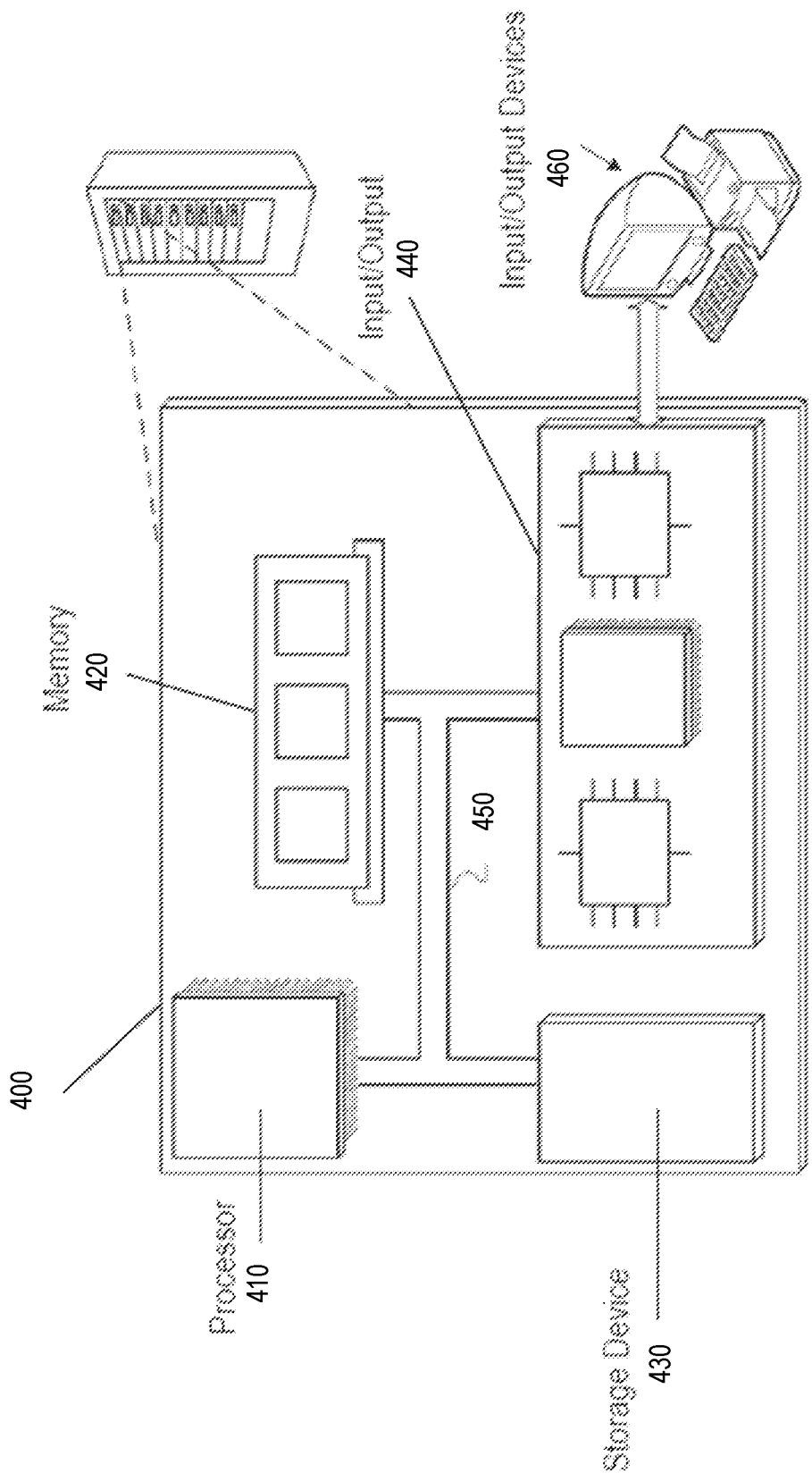
FIG. 4 is a block diagram of an example computer system.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, for example as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
    receiving a write transaction for a database, wherein the write transaction is configured to write to data of a partition stored by a cluster of database nodes;
    calculating, at a database node of the cluster, a duration by adding at least (i) a latency between a pair of database nodes of the cluster and (ii) a maximum clock offset between a pair of clocks corresponding to respective database nodes of the cluster, wherein the duration is greater than or equal to a sum of the latency and maximum clock offset;
    generating and associating, at the database node of the cluster, a synthetic timestamp with the write transaction, wherein the synthetic timestamp is generated by adding (i) a first timestamp corresponding to a present time indicated by a clock corresponding to the database node and (ii) the duration, wherein the synthetic timestamp exceeds the first timestamp by the duration;
    executing, based on determining the synthetic timestamp and during the duration between the first timestamp and the synthetic timestamp, one or more operations of the write transaction by writing to the data of the partition at one or more replicas of the partition, wherein the one or more replicas comprise a leader replica and one or more follower replicas;
    sending, from the leader replica to the one or more follower replicas, the write transaction and a closed timestamp update comprising the synthetic timestamp, wherein based on receiving the closed timestamp update and before the synthetic timestamp, the leader replica and the one or more follower replicas are each configured to serve a first read transaction directed to reading the data of the partition at a timestamp that is during the execution of the one or more operations of the write transaction and before the synthetic timestamp;
    committing, based on a threshold number of the one or more replicas acknowledging the write transaction, the one or more operations of the write transaction at the one or more replicas before the synthetic timestamp, wherein the committing further comprises:
        committing, at the leader replica, the one or more operations of the write transaction before the synthetic timestamp;
        sending, from the leader replica, an indication to commit the one or more operations of the write transaction to the one or more follower replicas; and
    sending, based on a second timestamp associated with the cluster of database nodes exceeding the synthetic timestamp, an indication of success of the write transaction to a client device.

2. The method of claim 1, wherein the write transaction is directed to a second partition stored by the cluster of database nodes, further comprising:
    generating and associating a second synthetic timestamp with the write transaction, wherein the second synthetic timestamp is generated based on a third timestamp indicated by a clock of a second database node of the cluster of database nodes and the duration, wherein the second synthetic timestamp exceeds the third timestamp by the duration; and executing, based on determining the second synthetic timestamp, the one or more operations of the write transaction at one or more replicas of the second partition.

3. The method of claim 2, wherein sending the indication of success of the write transaction to the client device further comprises:
sending, based on the second timestamp exceeding both the synthetic timestamp and the second synthetic timestamp, an indication of success of the write transaction to the client device.

4. The method of claim 1, wherein the one or more replicas are stored among a plurality of database nodes of the cluster.

5. The method of claim 1, wherein executing the one or more operations of the write transaction further comprises:
writing one or more provisional values to the data of the partition at the one or more replicas of the partition; and
appending, to one or more transaction logs associated with each of the one or more replicas, the one or more operations of the write transaction.

6. The method of claim 1, further comprising:
determining, during the execution of the one or more operations of the write transaction, the present time indicated by the clock to be greater than or equal to a threshold timestamp, wherein the threshold timestamp is based on the synthetic timestamp; and
based on the determination the present time indicated by the clock is greater than or equal to a threshold timestamp:
(i) increasing the duration by a configured interval; and
(ii) updating the synthetic timestamp based on the increased duration, wherein the updated synthetic timestamp exceeds the first timestamp by the increased duration.

7. The method of claim 1, further comprising:
receiving a second read transaction directed to reading the data of the partition at a fourth timestamp, wherein the fourth timestamp is before the synthetic timestamp and after the first timestamp.

8. The method of claim 7, further comprising:
serving, from a replica of the one or more replicas and during the execution of the one or more operations of the write transaction, the second read transaction based on determining the synthetic timestamp to be after an uncertainty interval, wherein the uncertainty interval is configured based on adding (i) the fourth timestamp and (ii) the maximum clock offset.

9. The method of claim 8, wherein the replica is a follower replica of the one or more follower replicas.

10. The method of claim 7, further comprising:
updating the fourth timestamp to a fifth timestamp based on determining the synthetic timestamp to be within an uncertainty interval, wherein the fifth timestamp is after the synthetic timestamp, and wherein the uncertainty interval is configured based on adding (i) the fourth timestamp and (ii) the maximum clock offset; and
serving, from a replica of the one or more replicas, the second read transaction at the fifth timestamp.

11. The method of claim 1, further comprising:
receiving a second read transaction directed to reading the data of the partition at a sixth timestamp, wherein the sixth timestamp is after the synthetic timestamp; and
serving, from a replica of the one or more replicas, the second read transaction.

12. A system comprising:
one or more computers each comprising at least one processor and at least one memory, the one or more computers programmed to perform operations comprising:
receiving a write transaction for a database, wherein the write transaction is configured to write to data of a partition stored by a cluster of database nodes;
calculating, at a database node of the cluster, a duration by adding at least (i) a latency between a pair of database nodes of the cluster and (ii) a maximum clock offset between a pair of clocks corresponding to respective database nodes of the cluster, wherein the duration is greater than or equal to a sum of the latency and maximum clock offset;
generating and associating, at the database node of the cluster, a synthetic timestamp with the write transaction, wherein the synthetic timestamp is generated by adding (i) a first timestamp corresponding to a present time indicated by a clock corresponding to the database node and (ii) the duration, wherein the synthetic timestamp exceeds the first timestamp by the duration;
executing, based on determining the synthetic timestamp and during the duration between the first timestamp and the synthetic timestamp, one or more operations of the write transaction by writing to the data of the partition at one or more replicas of the partition, wherein the one or more replicas comprise a leader replica and one or more follower replicas;
sending, from the leader replica to the one or more follower replicas, the write transaction and a closed timestamp update comprising the synthetic timestamp, wherein based on receiving the closed timestamp update and before the synthetic timestamp, the leader replica and the one or more follower replicas are each configured to serve a first read transaction directed to reading the data of the partition at a timestamp that is during the execution of the one or more operations of the write transaction and before the synthetic timestamp;
committing, based on a threshold number of the one or more replicas acknowledging the write transaction, the one or more operations of the write transaction at the one or more replicas before the synthetic timestamp, wherein the committing further comprises:
committing, at the leader replica, the one or more operations of the write transaction before the synthetic timestamp;
sending, from the leader replica, an indication to commit the one or more operations of the write transaction to the one or more follower replicas; and
sending, based on a second timestamp associated with the cluster of database nodes exceeding the synthetic timestamp, an indication of success of the write transaction to a client device.

13. The system of claim 12, wherein the write transaction is directed to a second partition stored by the cluster of database nodes, and wherein the operations further comprise:
generating and associating a second synthetic timestamp with the write transaction, wherein the second synthetic timestamp is generated based on a third timestamp indicated by a clock of a second database node of the cluster of database nodes and the duration, wherein the second synthetic timestamp exceeds the third timestamp by the duration; and executing, based on determining the second synthetic timestamp, the one or more operations of the write transaction at one or more replicas of the second partition.

14. The system of claim 13, wherein sending the indication of success of the write transaction to the client device further comprises:
sending, based on the second timestamp exceeding both the synthetic timestamp and the second synthetic timestamp, an indication of success of the write transaction to the client device.

15. The system of claim 12, wherein the one or more replicas are stored among a plurality of database nodes of the cluster.

16. The system of claim 12, wherein executing the one or more operations of the write transaction further comprises:
writing one or more provisional values to the data of the partition at the one or more replicas of the partition; and
appending, to one or more transaction logs associated with each of the one or more replicas, the one or more operations of the write transaction.

17. The system of claim 12, wherein the operations further comprise:
determining, during the execution of the one or more operations of the write transaction, the present time indicated by the clock to be greater than or equal to a threshold timestamp, wherein the threshold timestamp is based on the synthetic timestamp; and
based on the determination the present time indicated by the clock is greater than or equal to a threshold timestamp:
(i) increasing the duration by a configured interval; and
(ii) updating the synthetic timestamp based on the increased duration, wherein the updated synthetic timestamp exceeds the first timestamp by the increased duration.

18. The system of claim 12, wherein the operations further comprise:
receiving a second read transaction directed to reading the data of the partition at a fourth timestamp, wherein the fourth timestamp is before the synthetic timestamp and after the first timestamp.

19. The system of claim 18, wherein the operations further comprise:
serving, from a replica of the one or more replicas and during the execution of the one or more operations of the write transaction, the second read transaction based on determining the synthetic timestamp to be after an uncertainty interval, wherein the uncertainty interval is configured based on adding (i) the fourth timestamp and (ii) the maximum clock offset.

20. The system of claim 19, wherein the replica is a follower replica of the one or more follower replicas.

21. The system of claim 18, wherein the operations further comprise:
updating the fourth timestamp to a fifth timestamp based on determining the synthetic timestamp to be within an uncertainty interval, wherein the fifth timestamp is after the synthetic timestamp, and wherein the uncertainty interval is configured based on adding (i) the fourth timestamp and (ii) the maximum clock offset; and
serving, from a replica of the one or more replicas, the second read transaction at the fifth timestamp.

22. The system of claim 12, wherein the operations further comprise:
receiving a second read transaction directed to reading the data of the partition at a sixth timestamp, wherein the sixth timestamp is after the synthetic timestamp; and
serving, from a replica of the one or more replicas, the second read transaction.

23. The method of claim 1, wherein the maximum clock offset comprises a maximum allowed timestamp difference between a first clock of the pair of clocks and a second clock of the pair of clocks, wherein the pair of clocks correspond to any respective pair of database nodes of the cluster, wherein a timestamp difference between the pair of clocks is less than or equal to the maximum allowed timestamp difference.

24. The method of claim 1, wherein the duration is further calculated by adding a clock skew value, wherein the duration is greater than or equal to a sum of the latency, the maximum clock offset, and the clock skew value.

25. The method of claim 24, wherein the clock skew value is based on a timestamp difference between a first clock of the pair of clocks and a second clock of the pair of clocks.

26. The system of claim 12, wherein the maximum clock offset comprises a maximum allowed timestamp difference between a first clock of the pair of clocks and a second clock of the pair of clocks, wherein the pair of clocks correspond to any respective pair of database nodes of the cluster, wherein a timestamp difference between the pair of clocks is less than or equal to the maximum allowed timestamp difference.

27. The system of claim 12, wherein the duration is further calculated by adding a clock skew value, wherein the duration is greater than or equal to a sum of the latency, the maximum clock offset, and the clock skew value.

28. The system of claim 27, wherein the clock skew value is based on a timestamp difference between a first clock of the pair of clocks and a second clock of the pair of clocks.

* * * * *